(12) United States Patent
Chang et al.

(10) Patent No.: US 10,390,020 B2
(45) Date of Patent: *Aug. 20, 2019

(54) VIDEO ENCODING METHODS AND SYSTEMS USING ADAPTIVE COLOR TRANSFORM

(71) Applicant: INDUSTRIAL TECHNOLOGY RESEARCH INSTITUTE, Hsinchu (TW)

(72) Inventors: Yao-Jen Chang, Hsinchu (TW); Chun-Lung Lin, Yunlin County (TW); Jih-Sheng Tu, Yilan (TW); Ching-Chieh Lin, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,108

(22) Filed: Jun. 29, 2016

(65) Prior Publication Data

US 2016/0360198 A1     Dec. 8, 2016

Related U.S. Application Data

(63) Continuation-in-part of application No. 14/757,556, filed on Dec. 24, 2015.

(60) Provisional application No. 62/290,992, filed on Feb. 4, 2016, provisional application No. 62/172,256, filed on Jun. 8, 2015.

(30) Foreign Application Priority Data

May 9, 2016   (TW) .............................. 105114323 A

(51) Int. Cl.
*H04N 19/46*      (2014.01)
*H04N 19/96*      (2014.01)
(Continued)

(52) U.S. Cl.
CPC ......... *H04N 19/147* (2014.11); *H04N 19/103* (2014.11); *H04N 19/119* (2014.11); (Continued)

(58) Field of Classification Search
None
See application file for complete search history.

(56) References Cited

U.S. PATENT DOCUMENTS 8,090,019 B2   1/2012   Guo et al.
8,472,083 B2   6/2013   Arakawa et al.
(Continued)

FOREIGN PATENT DOCUMENTS

CN     104126303 A    10/2014
JP     2014-506756 A   3/2014
(Continued)

OTHER PUBLICATIONS

Detlev Marpe et al., "An Adaptive Color Transform Approach and Its Application in 4:4:4 Video Coding", 14th European Signal Processing Conference (EUSIPCO 2006), Florence, Italy, Sep. 4-8, 2006.

(Continued)

*Primary Examiner* — Kate H Luo
(74) *Attorney, Agent, or Firm* — Rabin & Berdo, P.C.

(57) ABSTRACT

A video encoding method includes receiving a source video frame, dividing the source video frame into a coding tree unit, determining a coding unit from the coding tree unit, enabling or disabling a coding mode of the coding unit, determining, if the coding mode is enabled, whether to evaluate a size of a transform unit for the enabled coding mode, and determining a transform unit of the coding unit for the enabled coding mode, wherein the size of the coding unit is defined by a number (N) of samples.

20 Claims, 17 Drawing Sheets

(51) Int. Cl.
*H04N 19/103* (2014.01)
*H04N 19/119* (2014.01)
*H04N 19/122* (2014.01)
*H04N 19/147* (2014.01)
*H04N 19/176* (2014.01)
*H04N 19/186* (2014.01)
*H04N 19/593* (2014.01)

(52) U.S. Cl.
CPC ......... *H04N 19/122* (2014.11); *H04N 19/176* (2014.11); *H04N 19/186* (2014.11); *H04N 19/46* (2014.11); *H04N 19/593* (2014.11); *H04N 19/96* (2014.11)

(56) References Cited

U.S. PATENT DOCUMENTS

| | | | |
|---|---|---|---|
| 8,693,551 B2 | 4/2014 | Zheludkov et al. | |
| 8,885,701 B2 | 11/2014 | Saxena et al. | |
| 8,923,395 B2 | 12/2014 | Wang et al. | |
| 9,154,784 B2 | 10/2015 | Jeong et al. | |
| 9,154,808 B2 | 10/2015 | Pandit et al. | |
| 9,179,146 B2 | 11/2015 | Song et al. | |
| 9,189,869 B2 | 11/2015 | Yie et al. | |
| 2014/0192869 A1* | 7/2014 | Laroche | H04N 19/00066 375/240.12 |
| 2014/0307785 A1* | 10/2014 | Topiwala | H04N 19/164 375/240.07 |
| 2014/0355689 A1 | 12/2014 | Tourapis | |
| 2014/0376611 A1* | 12/2014 | Kim | H04N 19/176 375/240.02 |
| 2015/0326857 A1 | 11/2015 | Zhang et al. | |
| 2015/0326879 A1 | 11/2015 | Alshina et al. | |
| 2015/0373327 A1* | 12/2015 | Zhang | H04N 19/124 375/240.03 |
| 2016/0080751 A1* | 3/2016 | Xiu | H04N 19/124 375/240.02 |
| 2016/0261870 A1* | 9/2016 | Tu | H04N 19/14 |
| 2016/0360205 A1* | 12/2016 | Chang | H04N 19/136 |
| 2017/0180740 A1* | 6/2017 | Topiwala | H04N 19/164 |

FOREIGN PATENT DOCUMENTS

| | | |
|---|---|---|
| JP | 2015-026964 A | 2/2015 |
| JP | 2015-076666 A | 4/2015 |
| JP | 2015-076765 A | 4/2015 |
| TW | 201445982 A | 12/2014 |
| WO | WO 2012-070232 A1 | 5/2012 |

OTHER PUBLICATIONS

Philippe Bordes et al., "Content-Adaptive Color Transform for HEVC", Picture Coding Symposium (PCS), pp. 245-248, Dec. 8-11, 2013.

Alexander Suhre et al., "Content-Adaptive Color Transform for Image Compression", Proceedings of 2010 IEEE 17th International Conference on Image Processing, pp. 189-192, Sep. 26-29, 2010.
Shinji Fukuma et al., "Inter Color and Inter/Intra Band Prediction on Reversible Wavelet for Lossless Progressive Color Coding", International Conference on Image Processing, vol. 4, pp. 53-57, Oct. 24-28, 1999.
Luis F. R. Lucas et al., "Intra-Prediction for Color Image Coding Using YUV Correlation", Proceedings of 2010 IEEE 17th International Conference on Image Processing, pp. 1329-1332, Sep. 26-29, 2010.
Li Zhang et al., "SCCE5 Test 3.2.1: In-loop color-space transform", Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014.
Li Zhang et al., "AhG8: In-loop color-space transform", Joint Collaborative Team on Video Coding (JCT-VC) of ITU-T SG 16 WP 3 and ISO/IEC JTC 1/SC 29/WG 11, May 27, 2014.
Xiaoyu Xiu et al., "On inter-component de-correlation for screen content coding", Joint Collaborative Team on Video Coding (JCT-VC) of ITC-T SG 16 WP 3 and ISO/IEC JTC 1/SC 29/WG 11, Oct. 24, 2014.
Japanese Office Action dated Jun. 20, 2017 with translation.
PoLin Lai et al., "AHG6: On adaptive color transform (ACT) in SCM2.0", Joint Collaborative Team on Video Coding (JCT-VC) of ITU-T SG 16 WP 3 and ISO/IEC JTC1/SC29/WG11, Oct. 17-24, 2014.
Rajan Joshi et al., "Screen content coding test model 2 (SCM 2)", Joint Collaborative Team on Video Coding (JCT-VC) of ITU-T SG 16 WP 3 and ISO/IEC JTC1/SC29/WG11, Mar. 27-Apr. 4, 2014.
K. McCann et al., "High Efficiency Video Coding (HEVC) Test Model 16 (HM 16) Encoder Description", Joint Collaborative Team on Video Coding (JCT-VC) of ITU-T SG 16 WP 3 and ISO/IEC JTC1/SC29/WG11, Jun. 30-Jul. 9, 2014.
PoLin Lai et al., "AHG6: Coding performance of SCC tools and suggested common test conditions", Joint Collaborative Team on Video Coding (JCT-VC) of ITU-T SG 16 WP 3 and ISO/IEC JTC1/SC29/WG11, Feb. 10-18, 2015.
Rajan Joshi et al., "High Efficiency Video Coding (HEVC) Screen Content Coding: Draft 1"., Joint Collaborative Team on Video Coding (JCT-VC) of ITU-T SG 16 WP 3 and ISO/IEC JTC1/SC29/WG11, Jun. 30-Jul. 9, 2014.
Yao-Jen chang et al., "Non-CE: Encoder modification for intra prediction mode using adaptive colour transform", Joint Collaborative Team on Video Coding (JCT-VC) of ITU-T SG 16 WP 3 and ISO/IEC JTC1/SC29/WG11, Jun. 19-26, 2015.
Yao-Jen chang et al., "SCC encoder improvement", Joint Collaborative Team on Video Coding (JCT-VC) of ITU-T SG 16 WP 3 and ISO/IEC JTC1/SC29/WG11, Feb. 19-26, 2016.
Extended European Search Report dated Oct. 31, 2016.
Taiwanese Office Action dated Jan. 23, 2017.
Chinese Office Action dated Apr. 10, 2019.

* cited by examiner

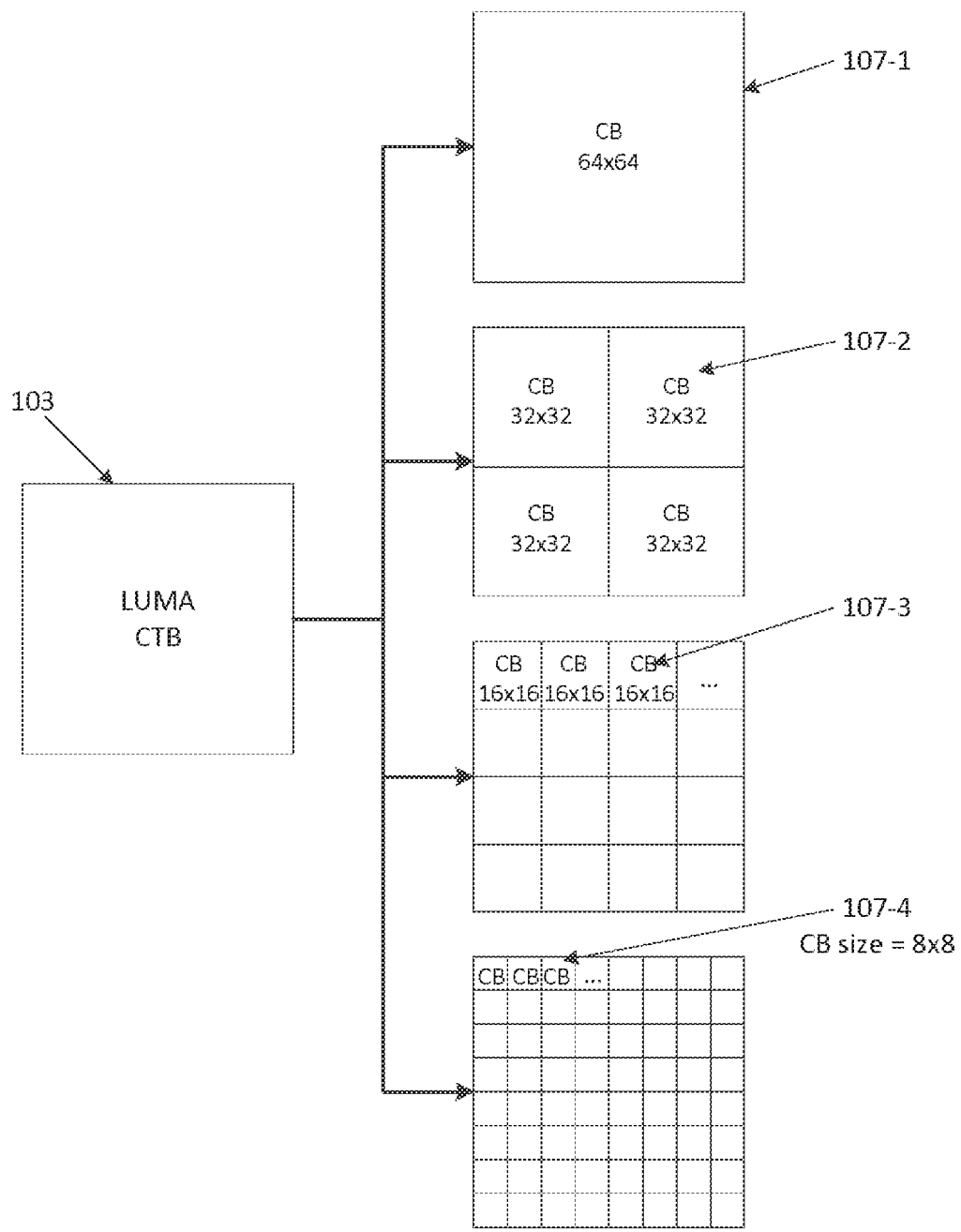

VIDEO ENCODING METHODS AND SYSTEMS USING ADAPTIVE COLOR TRANSFORM

RELATED APPLICATIONS

This application is a continuation-in-part application of co-pending patent application Ser. No. 14/757,556, filed Dec. 24, 2015, which claims the benefit of U.S. Provisional Patent Application No. 62/172,256, filed Jun. 8, 2015. This application claims the benefits of U.S. Provisional Patent Application No. 62/290,992, filed Feb. 4, 2016, and Taiwan Patent Application No. 105114323, filed May 9, 2016, the entire contents of which are incorporated herein by reference.

TECHNICAL FIELD

This disclosure generally relates to methods and systems for video encoding and decoding.

BACKGROUND

The demand for high quality video continually increases. With the advent of 4K and 8K video formats that require the processing of large amounts of video data, improvements to video encoding and decoding efficiency in the compression of such video data are needed. Furthermore, consumers expect the transmission and reception of high quality video across various transmission mediums. For example, consumers expect high quality video obtained over a network for viewing on portable devices, such as smartphones, tablets, and laptops, as well as on home televisions and computers. Consumers also expect high quality video for display during teleconferencing and screen sharing, for example.

The High Efficiency Video Coding (HEVC) standard H.265, implemented a new standard aimed at improving the performance of video encoding and decoding during video compression. Developed by the ISO/IEC JTC 1/SC 29/WG 11 Moving Picture Experts Group (MPEG) and the ITU-T SG16 Video Coding Experts Group (VCEG), HEVC reduces the data rate needed to compress high quality video in comparison to the previous standard, Advanced Video Coding (AVC). AVC is also known as H.264.

HEVC utilizes various coding tools, including inter prediction and intra prediction techniques to compress video during coding. Inter prediction techniques utilize temporal redundancies between different video frames in a video stream to compress video data. For example, a video frame being currently encoded may utilize portions of previously encoded and decoded video frames containing similar content. These portions of previously encoded and decoded video frames may be used to predict encoding of areas of the current video frame containing similar content. In contrast, intra prediction utilizes only video data within the currently encoded video frame to compress video data. No temporal redundancies between different video frames are employed in intra prediction techniques. For example, encoding of a current video frame may utilize other portions of the same frame. Intra prediction features 35 intra modes, with the modes including a Planar mode, a DC mode, and 33 directional modes.

HEVC also uses expansive partitioning and dividing of each input video frame compared to AVC. AVC relies only on macroblock division of an input video frame for its encoding and decoding. In contrast, HEVC may divide an input video frame into various data units and blocks that are sized differently, as will be described in more detail below. This aspect of HEVC provides improved flexibility in the encoding and decoding of video frames featuring large amounts of motion, detail, and edges, for example, and allows for efficiency gains over AVC.

Additional coding tools that further improve video coding under HEVC have been proposed for inclusion in the standard. These coding tools are named coding extensions. The Screen Content Coding (SCC) extension is a proposed extension that focuses on improving processing performance related to video screen content under the HEVC standard. Screen content is video containing a significant portion of rendered graphics, text, or animation, rather than camera captured video scenes. The rendered graphics, text, or animation may be moving or static, and may also be provided in a video feed in addition to camera captured video scenes. Example applications implicating SCC may include screen mirroring, cloud gaming, wireless display of content, displays generated during remote computer desktop access, and screen sharing, such as real-time screen sharing during video conferencing.

One coding tool included in SCC is the adaptive color transform (ACT). For example, an adaptive coding, transmission and efficient display of multimedia is disclosed in US patent publication No. 20140307785. The ACT is a color space transform applied to residue pixel samples of a coding unit (CU). For certain color spaces, correlations between color components of a pixel within a CU are present. When a correlation between color components of a pixel is high, performing the ACT on the pixel may help concentrate the energy of correlated color components by de-correlating the color components. Such concentrated energy allows for more efficient coding and decreased coding cost. Thus, the ACT may improve coding performance during HEVC coding.

However, evaluating whether to enable ACT, requires an additional rate distortion optimization (RDO) check during encoding, where the RDO check evaluates a rate distortion (RD) cost of the coding mode with enabled ACT. Such evaluations may increase both coding complexity and coding time. Furthermore, the ACT may not be necessary when color components of a pixel are already de-correlated. In such a case, further de-correlation of color components may not provide any benefit because the cost of performing the ACT is higher than coding performance gains.

SUMMARY

One aspect of the present disclosure is directed to a video encoding method. The method includes receiving a source video frame, dividing the source video frame into a coding tree unit, determining a coding unit from the coding tree unit, enabling or disabling a coding mode of the coding unit, determining, if the coding mode is enabled, whether to evaluate a size of a transform unit for the enabled coding mode; and determining a transform unit of the coding unit for the enabled coding mode, wherein the size of the coding unit is defined by a number (N) of samples.

Another aspect of the present disclosure is directed to a video encoding system. The system includes a memory storing instructions and a processor. The instructions, when executed by the processor, cause the processor to: receive a source video frame, divide the source video frame into a coding tree unit, determine a coding unit from the coding tree unit, enable or disable a coding mode of the coding unit, determine, if the coding mode is enabled, whether to evaluate a size of a transform unit for the enabled coding mode, and determine a transform unit of the coding unit for the enabled coding mode, wherein the size of the coding unit is defined by a number (N) of samples.

Another aspect of the present disclosure is directed to a non-transitory computer-readable storage medium storing a set of instructions. The instructions, when executed by one or more processors, cause the one or more processors to perform a method of video encoding. The method of video encoding includes:

receiving a source video frame, dividing the source video frame into a coding tree unit, determining a coding unit from the coding tree unit, enabling or disabling a coding mode of the coding unit, determining, if the coding mode is enabled, whether to evaluate a size of a transform unit for the enabled coding mode; and determining a transform unit of the coding unit for the enabled coding mode, wherein the size of the coding unit is defined by a number (N) of samples.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIGS. 1A-1J illustrate a video frame and related partitions of the video frame according to embodiments of the present disclosure.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of systems and methods consistent with aspects related to the disclosure as recited in the appended claims.

FIGS. 1A-1J illustrate a video frame and related partitions of the video frame according to embodiments of the present disclosure.

Figure 1A:
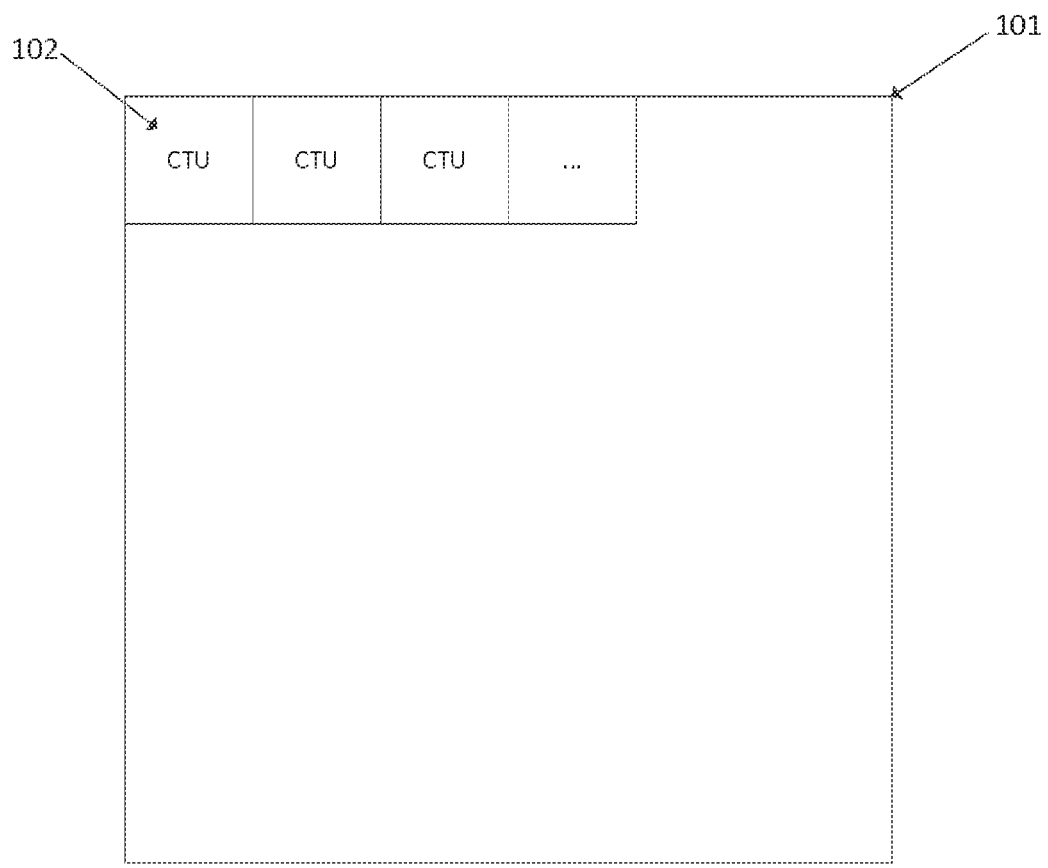

FIG. 1A shows a video frame 101 that includes a number of pixels located at locations within the video frame. Video frame 101 is partitioned into coding tree units (CTUs) 102.

Each CTU 102 is sized according to L vertical samples by L horizontal samples (L×L), where each sample corresponds to a pixel value located at a different pixel location in the CTU. For example, L may equal 16, 32, or 64 samples. Pixel locations may be locations where pixels are present in the CTU, or locations between where pixels are present in the CTU. When a pixel location is between where pixels are present, the pixel value is an interpolated value determined from pixels located at one or more spatial locations around the pixel location. Each CTU 102 includes a luma coding tree block (CTB), chroma CTBs, and associated syntax.

Figure 1B:
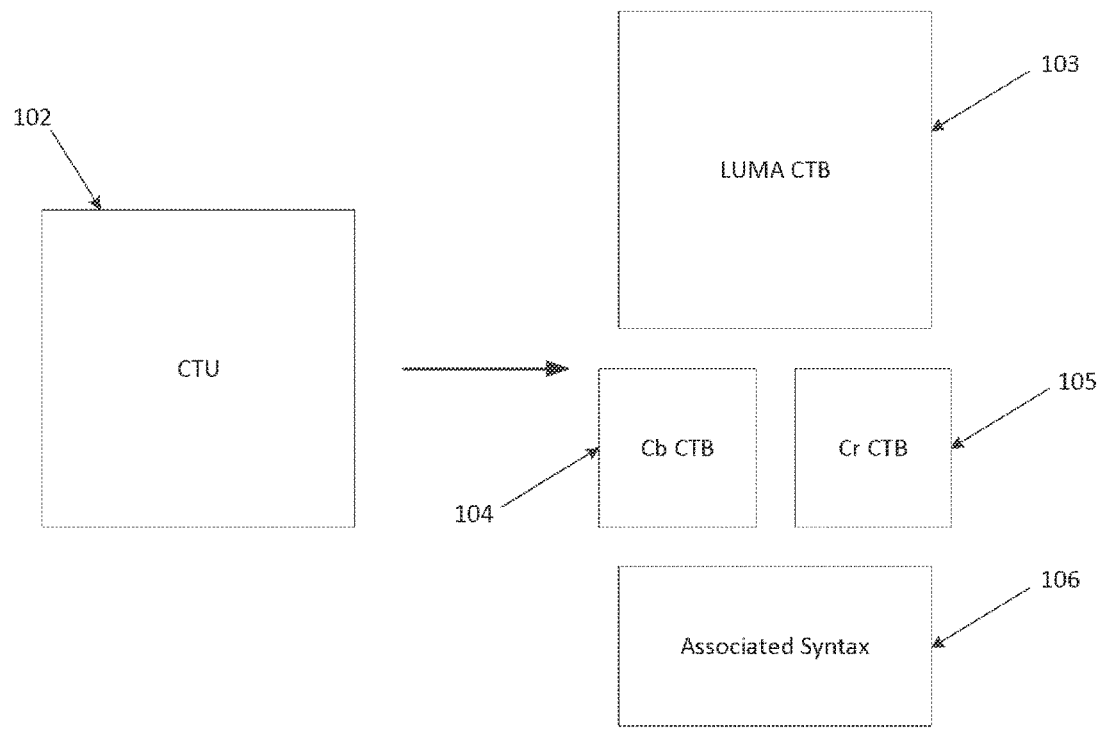

FIG. 1B shows CTBs that may be contained by a CTU 102 of FIG. 1A. For example, CTU 102 may include a luma CTB 103, and chroma CTBs 104 (Cb CTB) and 105 (Cr CTB). CTU 102 also may include associated syntax 106. The Cb CTB 104 is the blue difference chroma component CTB, and represents changes in blue colorfulness for the CTB. The Cr CTB 105 is the red difference chroma component CTB, and represents changes in red colorfulness for the CTB. Associated syntax 106 contains information as to how CTBs 103, 104, and 105 are to be coded, and any further subdivision of CTBs 103, 104, and 105. CTBs 103, 104, and 105 may have the same size as CTU 102. Alternatively, luma CTB 103 may have the same size as CTU 102, but chroma CTBs 104 and 105 may have sizes smaller than CTU 102.

Coding tools such as intra prediction, inter prediction, and others, operate on coding blocks (CBs). In order to enable a determination of whether to encode via intra prediction or inter prediction, CTBs may be partitioned into one or multiple CBs. Partitioning of CTBs into CBs is based on quad-tree splitting. Thus, a CTB may be partitioned into four CBs, where each CB may be further partitioned into four CBs. This partitioning may be continued based on the size of the CTB being partitioned.

FIG. 1C shows various partitionings of the luma CTB 103 of FIG. 1B into one or multiple luma CBs 107-1, 107-2, 107-3, or 107-4. For a 64×64 luma CTB, a corresponding luma CB 107 may be sized as N vertical by N horizontal (N×N) samples, such as 64×64, 32×32, 16×16, or 8×8. In FIG. 1C, luma CTB 103 is sized as 64×64. However, luma CTB 103 may alternatively be sized as 32×32 or 16×16.

Figure 1D:
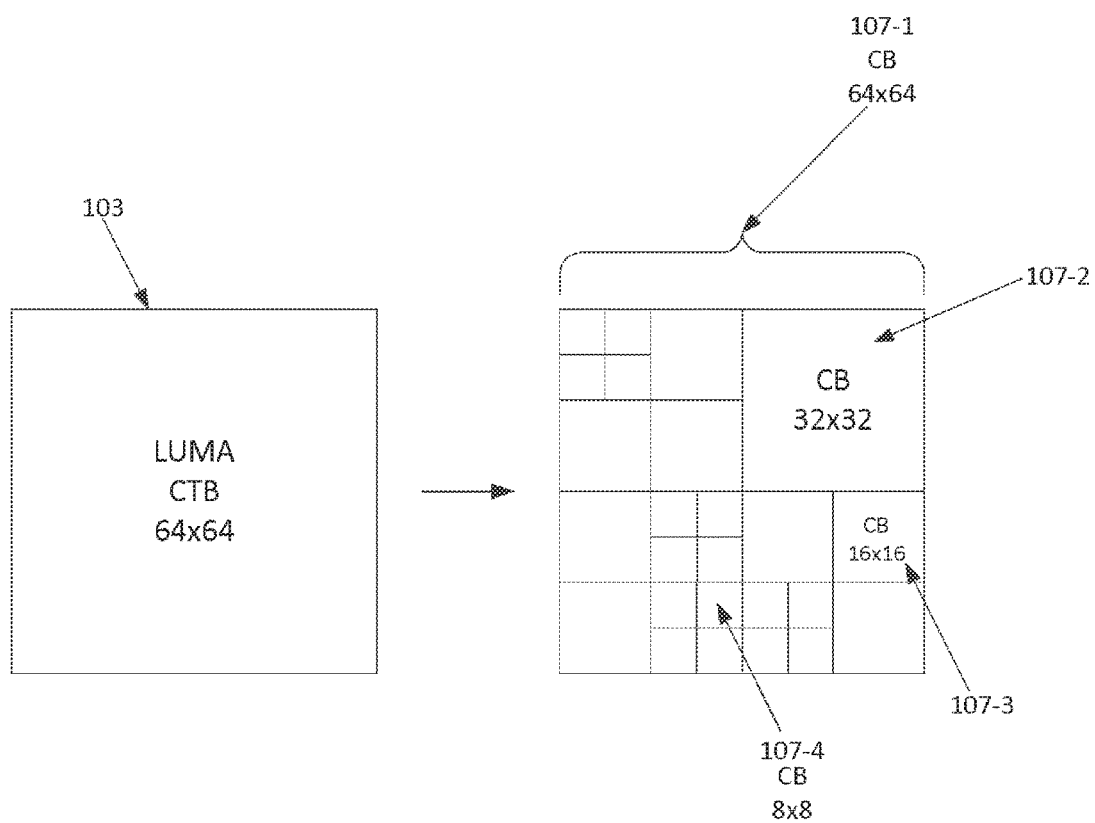

FIG. 1D shows an example of quadtree partitioning of luma CTB 103 of FIG. 1B, wherein luma CTB 103 is partitioned into CBs 107-1, 107-2, 107-3, or 107-4 shown in FIG. 1C. In FIG. 1D, luma CTB 103 is sized as 64×64. However, luma CTB 103 may be alternatively be sized as 32×32 or 16×16.

In FIG. 1D, luma CTB 103 is partitioned into four 32×32 CBs, labeled 107-2. Each 32×32 CB may further be partitioned into four 16×16 CBs, labeled 107-3. Each 16×16 CB may then be partitioned into four 8×8 CBs, labeled 107-4.

Coding units (CUs) are utilized to code CBs. A CTB contains only one CU or is divided to contain multiple CUs. Thus, a CU may also be sized as N vertical by N horizontal (N×N) samples, such as 64×64, 32×32, 16×16, or 8×8. Each CU contains a luma CB, two chroma CBs, and associated syntax. A residual CU formed during encoding and decoding may be sized the same as the CU corresponding to the residual CU.

Figure 1E:
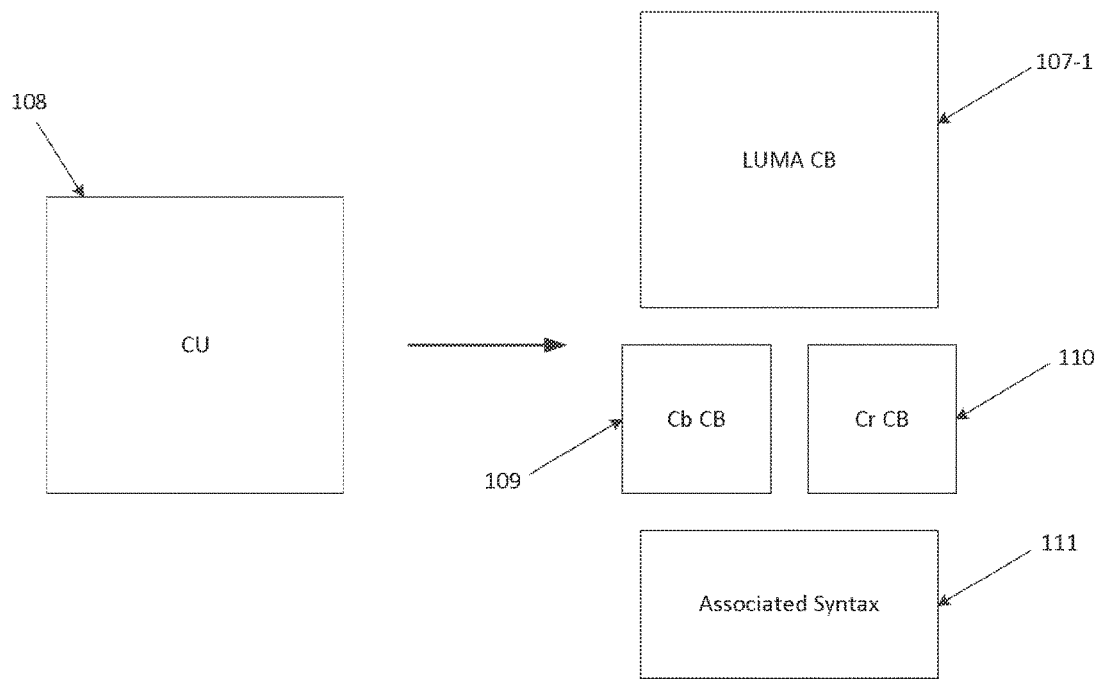

FIG. 1E shows CBs including, for example, luma CB 107-1 of FIG. 1C, that may be contained by a CU 108. For example, CU 108 may include luma CB 107-1, and chroma CBs 109 (Cb CB) and 110 (Cr CB). CU 108 may also include associated syntax 111. Associated syntax 111 contains information as to how CBs 107-1, 109, and 110 are to be encoded, such as quadtree syntax that specifies the size and positions of luma and chroma CBs, and further subdivision. Each CU 108 may has an associated partition of its CBs 107-1, 109, and 110 into prediction blocks (PBs). PBs are aggregated into prediction units (PUs).

Figure 1F:
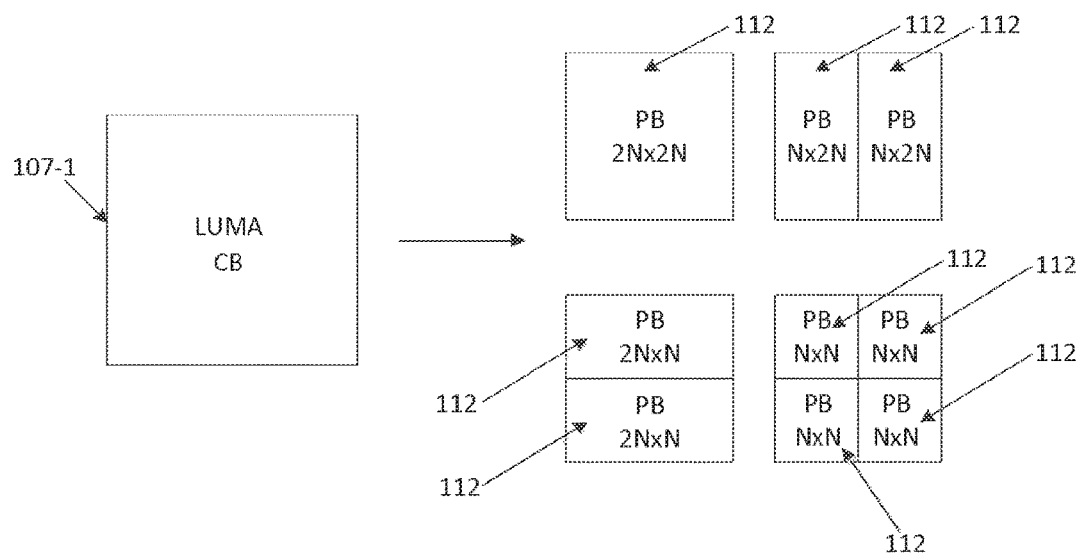

FIG. 1F shows alternative partitionings of CB 107-1 of FIG. 1D into luma PBs 112. CB 107-1 may, for example, be partitioned into PBs 112 depending on the predictability of the different areas of the CB 107-1. For example, CB 107-1 may contain a single PB 112 sized the same as CB 107-1. Alternatively, CB 107-1 may be partitioned vertically or horizontally into two even PBs 112, or CB 107-1 may be partitioned or CB 107-1 may be partitioned vertical or horizontally into four PBs 112. It is noted that the partitions shown in FIG. 1F are exemplary, and any other kinds of partitions into PBs allowable under the HEVC standard are contemplated by the present disclosure. Furthermore, the different partitions of CB 107-1 into PBs 112 as shown in FIG. 1F are mutually exclusive. As an example, in an intra prediction mode in HEVC, 64×64, 32×32, and 16×16 CBs may be partitioned only into a single PB sized the same as the CB, while 8×8 CBs may be partitioned into one 8×8 PB or four 4×4 PBs.

Once an intra or inter prediction for a block is made, a residual signal generated from a difference between the prediction block and the source video image block is transformed to another domain for further coding using transforms such as the discrete cosine transform (DCT) or discrete sine transform (DST). To provide this transform, one or more transform blocks (TB) are utilized for each CU or each CB.

Figure 1G:
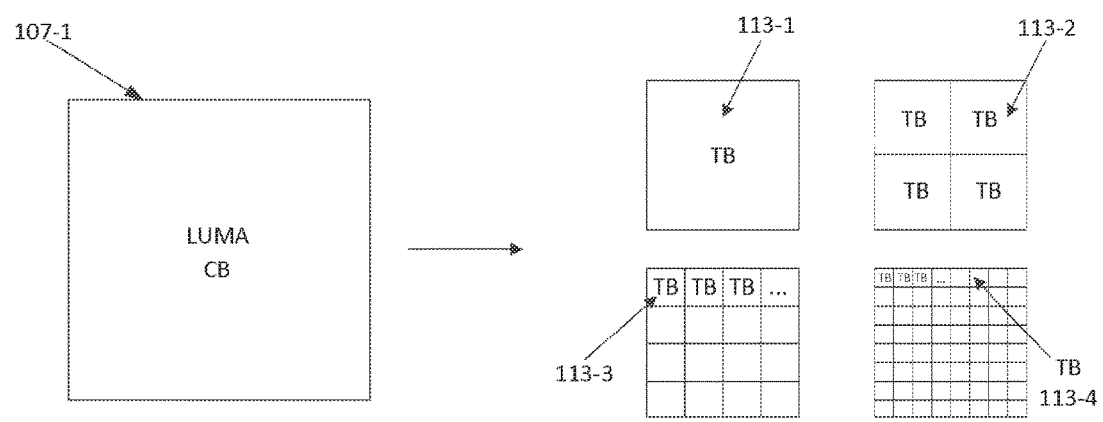

FIG. 1G shows how luma CB 107-1 of FIG. 1E or 1F is partitioned into different TBs 113-1, 113-2, 113-3, and 113-4. If CB 107-1 is a 64×64 CB, TB 113-1 is a 32×32 TB, TB 113-2 is a 16×16 TB, TB 113-3 is a 8×8 TB, and TB 113-4 is a 4×4 TB. CB 107-1 would be partitioned into four TBs 113-1, sixteen TBs 113-2, sixty-four TBs 113-3, and two-hundred and fifty-six TBs 113-4. A CB 107-1 may be partitioned into TBs 113 all of the same size, or of different sizes.

Partitioning of CBs into TBs is based on quad-tree splitting. Thus, a CB may be partitioned into one or multiple TBs, where each TB may be further partitioned into four TBs. This partitioning may be continued based on the size of the CB being partitioned.

Figure 1H:
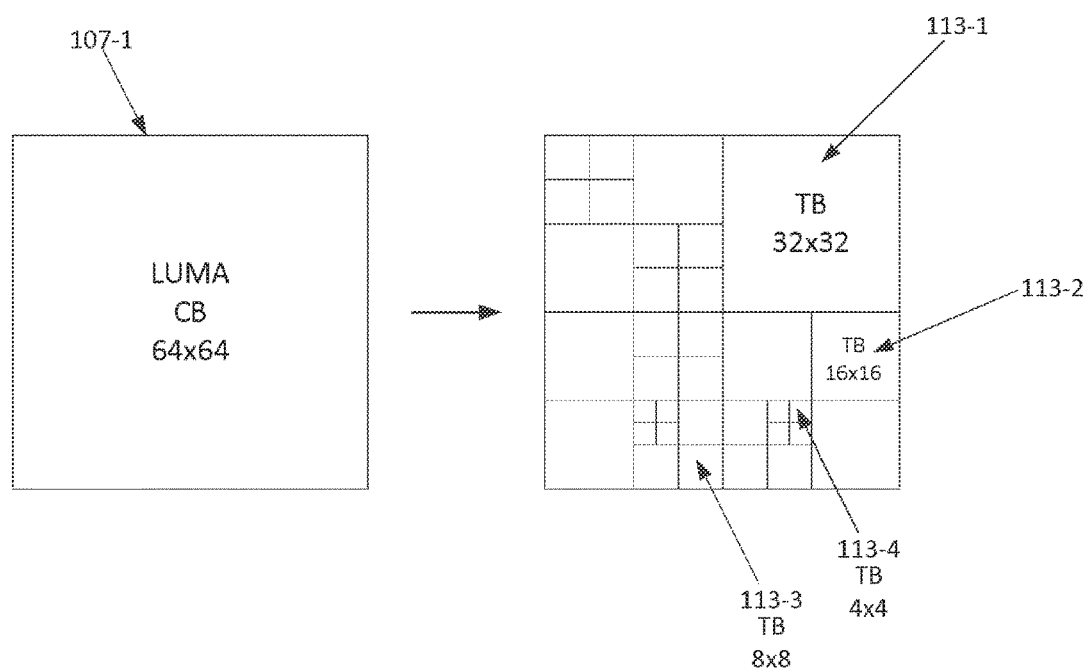

FIG. 1H shows an example of quadtree partitioning of luma CB 107-1 of FIG. 1E or 1F, utilizing the various partitionings into TBs 113-1, 113-2, 113-3, or 113-4 shown in FIG. 1G. In FIG. 1H, luma CB 107-1 is sized as 64×64. However, luma CB 107-1 may alternatively be sized as 32×32 or 16×16.

In FIG. 1H, luma CB 107-1 is partitioned into four 32×32 TBs, labeled 113-1. Each 32×32 TB may further be partitioned into four 16×16 TBs, labeled 113-2. Each 16×16 TB may then be partitioned into four 8×8 TBs, labeled 113-3. Each 8×8 TB may then be partitioned into four 4×4 TBs, labeled 113-4.

TBs 113 are then transformed via, for example a DCT, or any other transform contemplated by the HEVC standard. Transform units (TUs) aggregate TBs 113. One or more TBs are utilized for each CB. CBs form each CU. Thus, Transform unit (TU) structure is different for different CUs 108, and is determined from CUs 108.

Figure 1I:
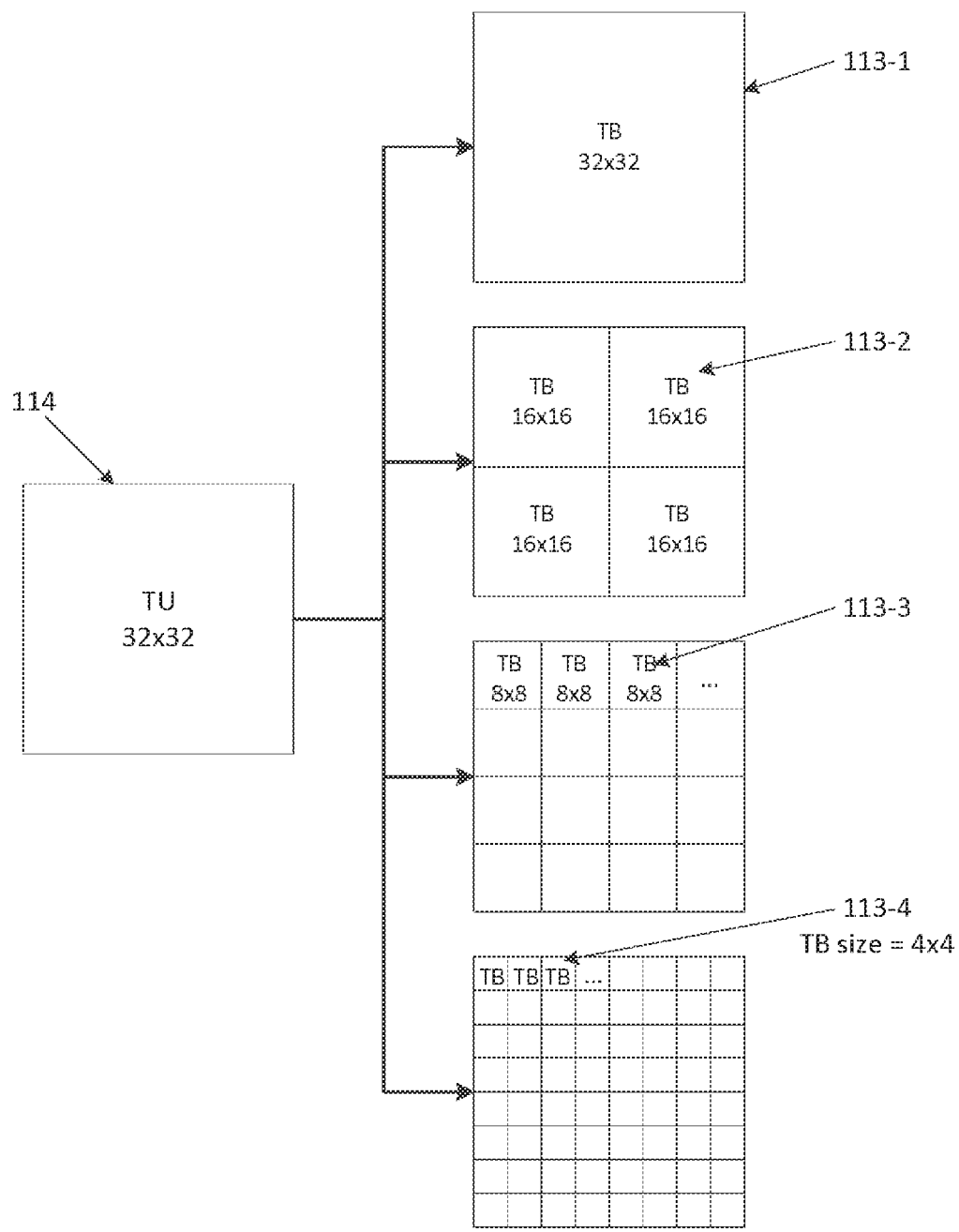

FIG. 1I shows alternative partitionings 113-1, 113-2, 113-3, and 113-4 of a TU 114, where each TU aggregates partitioned TBs of FIG. 1G or 1H. A 32×32 sized TU 114 can hold a single TB 113-1 sized 32×32, or one or more TBs 113 sized 16×16 (113-2), 8×8 (113-3), or 4×4 (113-4). For a CU enabling inter prediction in the HEVC, the TU may be larger than PU, such that the TU may contain PU boundaries. However, the TU may not cross PU boundaries for a CU enabling intra prediction in the HEVC.

Figure 1J:
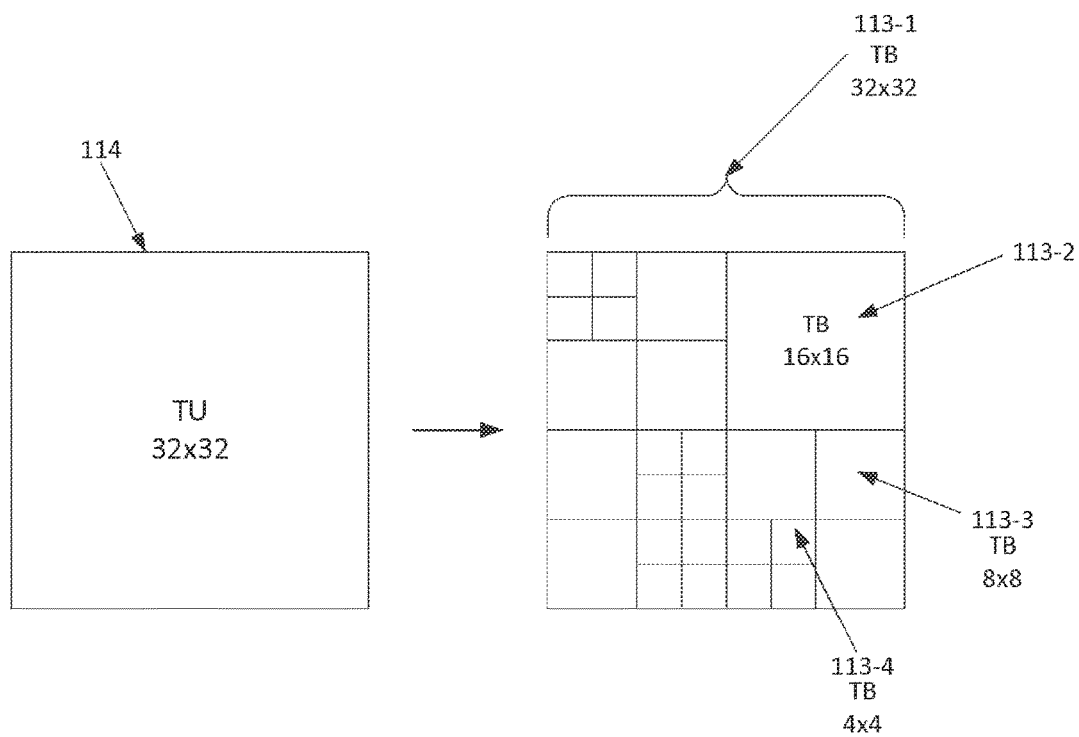

FIG. 1J shows an example of quadtree partitioning of TU 114 of FIG. 1I, utilizing the various partitionings into TBs 113-1, 113-2, 113-3, or 113-4 shown in FIG. 1I. In FIG. 1J, TU 114 is sized as 32×32. However, TU may alternatively be sized as 16×16, 8×8, or 4×4.

In FIG. 1J, TU 114 is partitioned into one TB 113-1 sized 32×32, and four 16×16 TBs labeled 113-2. Each 16×16 TB may further be partitioned into four 8×8 TBs, labeled 113-3. Each 8×8 TB may then be partitioned into four 4×4 TBs, labeled 113-4.

For any CTU, CTB, CB, CU, PU, PB, TU, or TB mentioned in the present disclosure, each may include any features, sizes, and properties in accordance with the HEVC standard. The partitioning shown in FIGS. 1C, 1E, and 1F also applies to the chroma CTBs CTB 104 (Cb CTB) and CTB 105 (Cr CTB), and chroma CBs CB 109 (Cb CB) and CB 110 (Cr CB).

Figure 2:
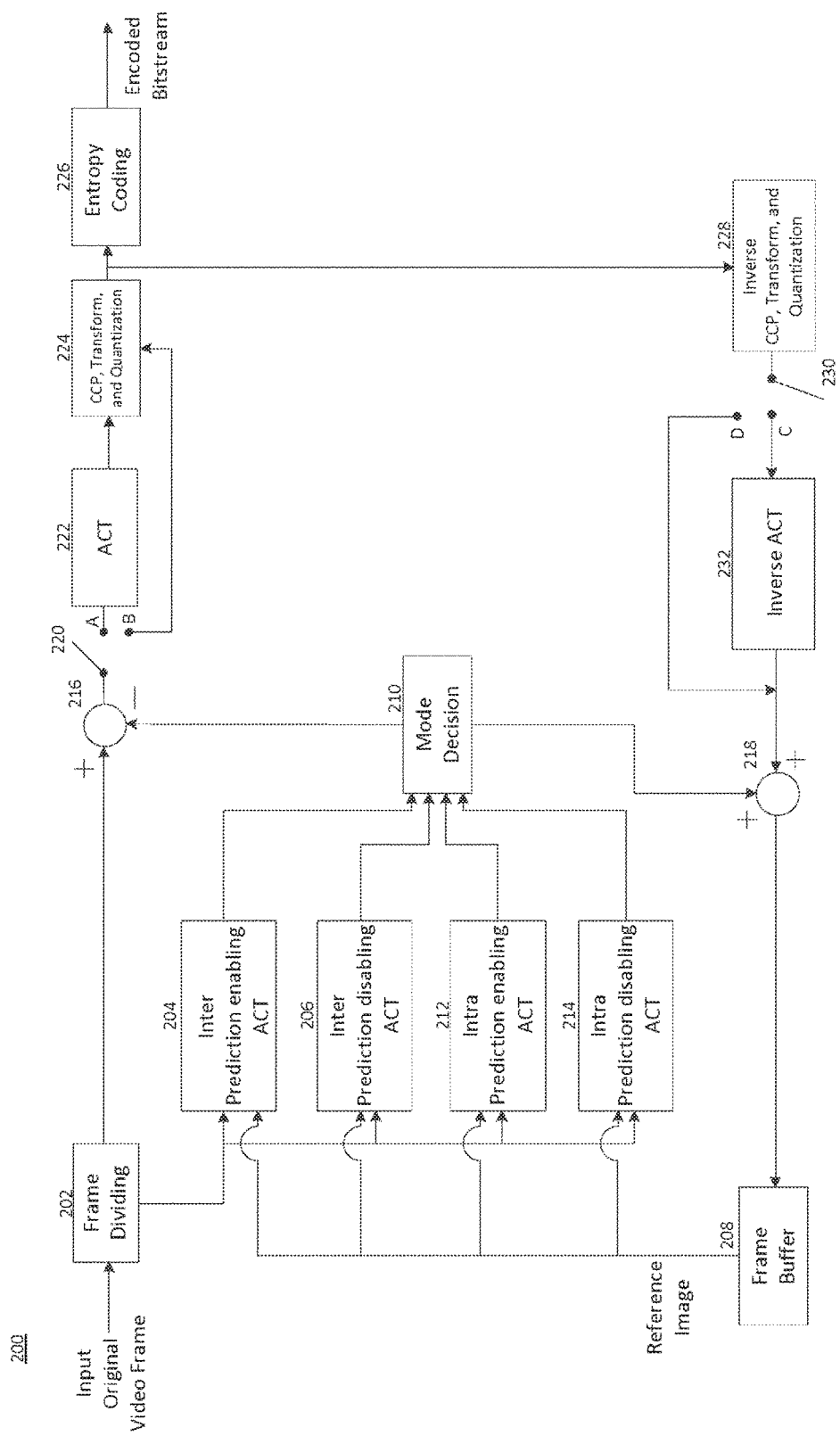
FIG. 2 shows an exemplary video encoder consistent with the present disclosure.

FIG. 2 shows an exemplary video encoder 200 for performing encoding methods consistent with the present disclosure. Video encoder 200 may include one or more additional components that provide additional encoding functions contemplated by HEVC-SCC, such as palette mode, sample adaptive offset, and de-blocking filtering. Additionally, the present disclosure contemplates intra prediction mode enabling ACT, as well as other coding modes, such as inter prediction mode enabling ACT.

An input source video frame is received by encoder 200. The input source frame is first input into a Frame Dividing Module 202, in which the frame is divided into at least one source CTU. A source CU is then determined from the source CTU. Source CTU sizes and source CU sizes are determined by Frame Dividing Module 202. Encoding then takes place on a CU-by-CU basis, with source CUs output by Frame Dividing Module 202 input into Inter Prediction enabling adaptive color transformation (ACT) Module 204, Inter Prediction disabling ACT Module 206, Intra Prediction enabling ACT Module 212, and Intra Prediction disabling ACT Module 214.

Source CUs of the input frame are encoded by Inter Prediction enabling ACT Module 204, in which a prediction of a source CU from the input frame is determined using inter prediction techniques with adaptive color transformation enabled. Source CUs of the input frame are also encoded by Inter Prediction disabling ACT Module 206, in which a prediction of a source CU from the input frame is determined using inter prediction techniques without ACT enabled, i.e., ACT is disabled.

Reference CUs from frames in a Frame Buffer 208 are utilized during the inter frame prediction. Source PUs and PBs are also determined from source CU and utilized during the inter frame prediction by Modules 204 and 206. Inter frame prediction utilizes motion estimation from regions of different temporally located video frames. Encoded inter prediction CUs from Modules 204 and 206 are determined that result in the highest picture quality. The encoded inter prediction CUs are then input into a Mode Decision Module 210.

Source CUs of the input frame are also encoded by Intra Prediction enabling ACT Module 212, in which a prediction of a source CU from the input frame is determined using intra prediction techniques with adaptive color transform.

Source CUs of the input frame are also encoded by Intra Prediction disabling ACT Module 214, in which a prediction of a source CU from the input frame is determined using intra prediction techniques without adaptive color transform, i.e., ACT is disabled.

Source CUs from the same frame located in Frame Buffer 208 are utilized during the intra frame prediction by Modules 212 and 214. Source PUs, and PBs are also determined from source CUs and utilized during the intra frame prediction by Modules 212 and 214. Encoded intra prediction CUs are determined that result in the highest picture quality. The encoded intra prediction CUs from Modules 212 and 214 are input into Mode Decision Module 210.

In Mode Decision Module 210 the costs of encoding the source CUs using inter prediction enabling ACT, inter prediction disabling ACT, intra prediction disabling ACT and intra prediction enabling ACT are compared, along with the quality of each of the predicted CUs. A determination is then made as to which encoding mode prediction CU, such as an intra prediction CU or an inter prediction CU, should be selected based on the comparison. The selected prediction CU is then sent to Summing Modules 216 and 218.

At Summing Module 216, the selected prediction CU is subtracted from the source CU version of itself, providing a residual CU. If the selected prediction CU is from one of Inter Prediction enabling ACT Module 204, or Intra Prediction enabling ACT Module 212, switch 220 is moved to position A. In position A, the residual CU is input into ACT Module 222, and thereafter input into CCP, Transform, and Quantization Module 224. However, if the selected prediction CU is from one of Inter Prediction disabling ACT Module 206, or Intra Prediction disabling ACT Module 214, switch 220 is move to position B. In position B, ACT Module 222 is skipped and not utilized during encoding, and the residual CU is instead directly input into CCP, Transform, and Quantization Module 224 from summing Module 216.

At ACT Module 222, adaptive color transform is performed on the residual CU. The output from ACT Module 222 is input into CCP, Transform, and Quantization Module 224.

At CCP, Transform, and Quantization Module 224, a cross component prediction (CCP), a transform such as a Discrete Cosine Transform (DCT) or Discrete Sine Transform (DST), and quantization of the CU residual are performed. The output of CCP, Transform, and Quantization Module 224 is input into Entropy Coding Module 226 and Inverse CCP, Transform, and Quantization Module 228.

At Entropy Coding Module 226, entropy encoding of the residual CU is performed. For example, Context Adaptive Binary Arithmetic Coding (CABAC) may be performed to encode the residual CU. Any other entropy encoding process provided under HEVC may be performed in Entropy Coding Module 226.

After entropy encoding, the encoded bit stream for the CU of the input video frame is output from the video encoder 200. The output encoded bit stream may be stored in a memory, broadcast over a transmission line or communication network, provided to a display, or the like.

At Inverse CCP, Transform, and Quantization Module 228, an inverse determination of the cross component prediction (CCP), transform, and quantization performed at Module 224 on the CU residual is performed to provide a reconstructed residual of the CU.

If the selected prediction CU is from one of Inter Prediction enabling ACT Module 204, or Intra Prediction enabling ACT Module 212, switch 230 is moved to position C. In position C, the reconstructed residual CU is input into Inverse ACT Module 232, and thereafter input into Summing Module 218. However, if the selected prediction CU is from one of Inter Prediction disabling ACT Module 206, or Intra Prediction disabling ACT Module 214, switch 230 is move to position D. In position D, Inverse ACT Module 232 is skipped and not utilized, and the reconstructed residual CU is instead directly input into Summing Module 218.

At Inverse ACT Module 232, an inverse adaptive color transform to that performed at ACT Module 222 is applied to the reconstructed residual CU. The output of Inverse ACT Module 232 is input into Summing Module 218.

At Summing Module 218, the reconstructed residual of the CU is added to the selected prediction CU from Mode Decision Module 210 to provide a reconstructed source CU. The reconstructed source CU is then stored in Frame Buffer 208 for use in Inter and Intra Prediction of other CUs.

Encoding methods 300, 400, and 500, described below, are performed within Intra Prediction enabling ACT Module 212. Through the use of encoding methods 300, 400, and 500, encoding efficiency and encoding time are improved.

The Inter Prediction enabling ACT Module 204, the Inter Prediction disabling ACT Module 206, the Intra Prediction enabling ACT Module 212 and the Intra Prediction disabling ACT Module 214 are not limited to be arranged in parallel. In one embodiment, the Inter Prediction enabling ACT Module 204, the Inter Prediction disabling ACT Module 206, the Intra Prediction enabling ACT Module 212 and the Intra Prediction disabling ACT Module 214 can be arranged sequentially. The arrangement of the Inter Prediction enabling ACT Module 204, the Inter Prediction disabling ACT Module 206, the Intra Prediction enabling ACT Module 212 and the Intra Prediction disabling ACT Module 214 can be modified.

Figure 3:
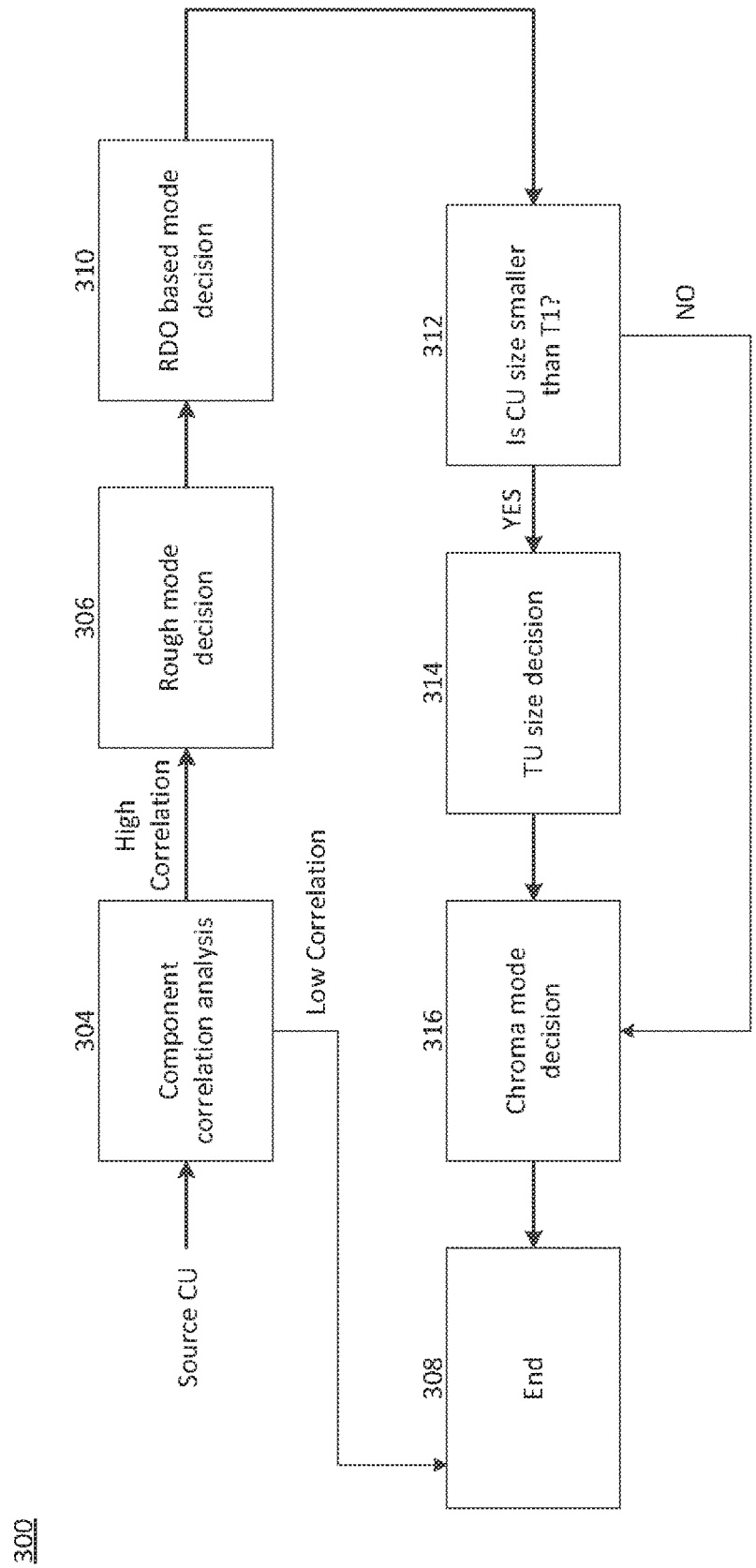
FIG. 3 illustrates an encoding method according to an exemplary embodiment of the present disclosure.

FIG. 3 illustrates an encoding method 300 for determining whether TU size evaluation should be performed in an ACT enabled intra prediction encoding process, according to an exemplary embodiment of the present disclosure. More particularly, encoding method 300 utilizes a threshold calculation regarding CU size and, based on the threshold calculation, determines whether a TU size evaluation should be performed.

At step 304, component correlation analysis is performed on a source CU to determine whether a coding mode with ACT of a coding unit should be enabled or disabled. A correlation of color components for each pixel contained in the CU is determined. For each pixel, correlation between color components is compared to a pixel correlation threshold. Based on the comparison, it is determined for each pixel whether the correlation is above, equal to, or below the pixel correlation threshold.

The total number of pixels above the pixel correlation threshold is determined for a CU, with those pixels equal to the pixel correlation threshold counted as being above the threshold. This total number of pixels is then compared to a CU correlation threshold.

If the total number of pixels is below the CU correlation threshold, then it is determined that color components of the CU have low correlation. It is therefore decided that ACT is not necessary for the CU, and the process proceeds to step 308, disabling ACT during encoding of the CU.

However, if the total number of pixels is above the CU correlation threshold, it is determined that color components of the CU have high correlation. In this case, it is determined that ACT is necessary to de-correlate the components of each pixel in the CU. When high correlation is calculated, ACT is enabled, and the process proceeds to step 306, and a rough mode decision as to the intra prediction mode with ACT enabled is determined.

The correlation analysis of step 304 may in addition or alternatively be based on the color space of a CU. For example, at step 304, color components of pixels in the CU may be analyzed and a color space of the CU determined. A color space may be determined as red, green, and blue (RGB), or as a luminance and chrominance (YUV) color space.

When a determination is made that the color space is RGB, the process proceeds to step 306, and the rough mode decision as to the intra prediction mode with ACT enabled is determined. Because RGB pixel components are more likely to have high correlation, ACT is necessary to de-correlate the components of each pixel in the CU in order to isolate pixel energy into a single component.

In contrast, when a determination is made that the color space is YUV, the process proceeds to step 308, disabling ACT. This is because YUV pixel components are more likely to have low correlation, with most pixel energy stored in a single pixel component. Thus, ACT is not necessary for YUV pixel components because further de-correlation of the CU pixel components will likely not yield additional encoding benefits.

In Intra Prediction enabling ACT Module 212, when ACT is disabled during encoding method 300, the coding mode of Intra Prediction enabling ACT is disabled and Module 212 does not output a prediction to Mode Decision Module 210.

In Inter Prediction enabling ACT Module 204, when ACT is disabled during inter prediction encoding, the coding mode of Inter Prediction enabling ACT is disabled and Module 204 does not output a prediction to Mode Decision Module 210.

At step 306, the rough mode decision as to the intra prediction mode with ACT enabled is determined. The rough mode decision may be a cost-based mode decision. For example, in the rough mode decision, a low complexity cost associated with encoding utilizing the selected coding mode is determined to fast select coding modes that are most likely the highest quality and lowest encoding cost.

At step 310, a rate distortion optimization (RDO) mode decision is determined for the encoding mode with ACT enabled. Here, a deviation from the original video, as well as a bit cost for encoding modes are calculated when ACT, CCP, Transform, Quantization, and entropy coding are performed. The deviation may be measured by an error calculation, such as mean squared error (MSE), for example. The encoding mode with the lowest encoding cost and highest encoding quality determined by the RDO analysis is then chosen.

For example, in Intra Prediction enabling ACT Module 212, 35 intra prediction modes (IPMs) are available for encoding. In the rough mode decision step 306 for Intra Prediction enabling ACT module 212, a selection of IPMs with the lowest encoding cost and highest encoding quality are selected out of the 35 IPMs using a simplified, low complexity encoding cost determination. For example, a sum of absolute transform distortion (SATD) cost may be utilized to determine a low complexity encoding cost of each IPM. The selection of IPMs with the lowest encoding cost and highest encoding quality may be a selection of 3 IPMs, or a selection of 8 IPMs, for example. In RDO mode decision step 310 for Intra Prediction enabling ACT module 212, an RDO mode decision is determined for each of the selected IPMs. A deviation from the original video, as well as a bit cost for encoding is calculated for each of the selected IPMs when ACT, CCP, Transform, Quantization, and entropy coding is performed. The deviation may be measured by an error calculation, such as MSE, for example. The IPM with the lowest encoding cost and highest encoding quality determined by the RDO analysis is then chosen from the selected IPMs.

A variant of the process described above in relation to Intra Prediction enabling ACT Module 212 may also be performed by Inter Prediction enabling ACT Module 204. For example, when Module 204 performs encoding method 300, at step 306, a rough mode decision of the best inter prediction from temporally adjacent video frames is determined that provides the lowest encoding cost and highest encoding quality. At step 310, an RDO mode decision is determined for the inter prediction. Here, a deviation from the original video, as well as a bit cost for encoding is calculated for the inter prediction when ACT, CCP, Transform, Quantization, and entropy coding is performed. The deviation may be measured by an error calculation, such as MSE, for example. The inter prediction with the lowest encoding cost and highest encoding quality determined by the RDO analysis is then chosen.

At step 312, the CU size of the current CU being processed is calculated. A CU may be sized as N vertical samples by N horizontal samples (N×N), where N may equal 4, 8, 16, 32, or 64. The N value for the CU is compared to a threshold T1. T1 may equal 4, 8, 16, 32, or 64. Based on the comparison, it is determined whether the CU size is smaller than T1, and thereby whether to evaluate sizes of a transform unit for the enabled coding mode. If the CU size is smaller than T1, the process proceeds to step 314 for a TU size decision. However, if the CU size is equal to or greater than T1, the process proceeds to step 316, bypassing the TU size decision step 314. At step 312, when the CU size is greater than T1, the size of the TU for the CU may be greater than T1. If the CU size is equal to or greater than T1, the TU quadtree structure may be determined as the largest possible TU size. For example, when CU size is equal to or greater than T1, for a CU sized 64×64, four TUs sized 32×32may be determined. In another example, when CU size is equal to or greater than T1, for CUs sized 32×32, 16×16, 8×8, or 4×4, a TU may be sized the same as the CU. For example, if a CU is sized 32×32, a corresponding TU may be sized 32×32.

The process of step 312 improves coding time and efficiency because the TU size decision may be time consuming and increase encoding cost. Thus, encoding cost and time is saved if the TU size decision can be skipped. Furthermore, a CU size equal to or greater than T1 implies that content of the CU is not complex. For example, a CU size greater that T1 may mean that large areas of a video image are free of edges, motion, or complex patterns. Therefore, determining a TU size may not be needed for efficiently encoding the CU with high video quality.

At step 314, if the CU size is smaller than T1, a TU size decision for the CU is performed. Here, a TU of the source CU is determined. TU sizes are analyzed by evaluating the RDO cost determined in step 310 for prediction modes to find the TU size resulting in the most efficient and high video quality ACT transform of the CU. TU sizes of 4×4, 8×8, 16×16, and 32×32, for example, are analyzed. When the TU size that results in the most efficient ACT transform is determined, this TU size is selected for the ACT transform of the CU and the process proceeds to step 316. The selected TU size may be determined as the best TU quad-tree structure size.

At step 316, a chroma mode decision is determined. A chroma mode decision is determined by determining the prediction mode determined in step 310, and using the determined prediction mode for chroma prediction to generate a chroma PU, and a corresponding chroma TU. The determined TU from step 312 or step 314 is also utilized to generate the chroma TU. The chroma TU is also subsampled according to the chroma format. Thus, in one example, when the chroma format is 4:2:0 and the luma TU size is 32×32, the determined chroma TU is a chroma TU sized 16×16.

At step 308, the process of selecting the best intra prediction mode and selecting the best TU quad-tree structure size is completed for Module 212. The prediction and the RDO cost are generated, and input into Mode Decision Module 210 for comparison with the RDO cost input into Mode Decision Module 210 from the other prediction modules. For example, Inter Prediction enabling ACT module 204 may generate a prediction of a CU with ACT applied to it and an RDO cost, and input the prediction CU and RDO cost into Mode Decision Module 210. Inter Prediction disabling ACT Module 206 and Intra Prediction disabling ACT Module 214 also each generate a prediction CU and RDO cost, and input their respective prediction CUs and RDO costs into Mode Decision Module 210. Mode Decision Module 210 compares the prediction CUs and RDO costs input from Modules 204, 206, 212, and 214, and determines a prediction CU that will be input into Summing Modules 216 and 218.

Figure 4:
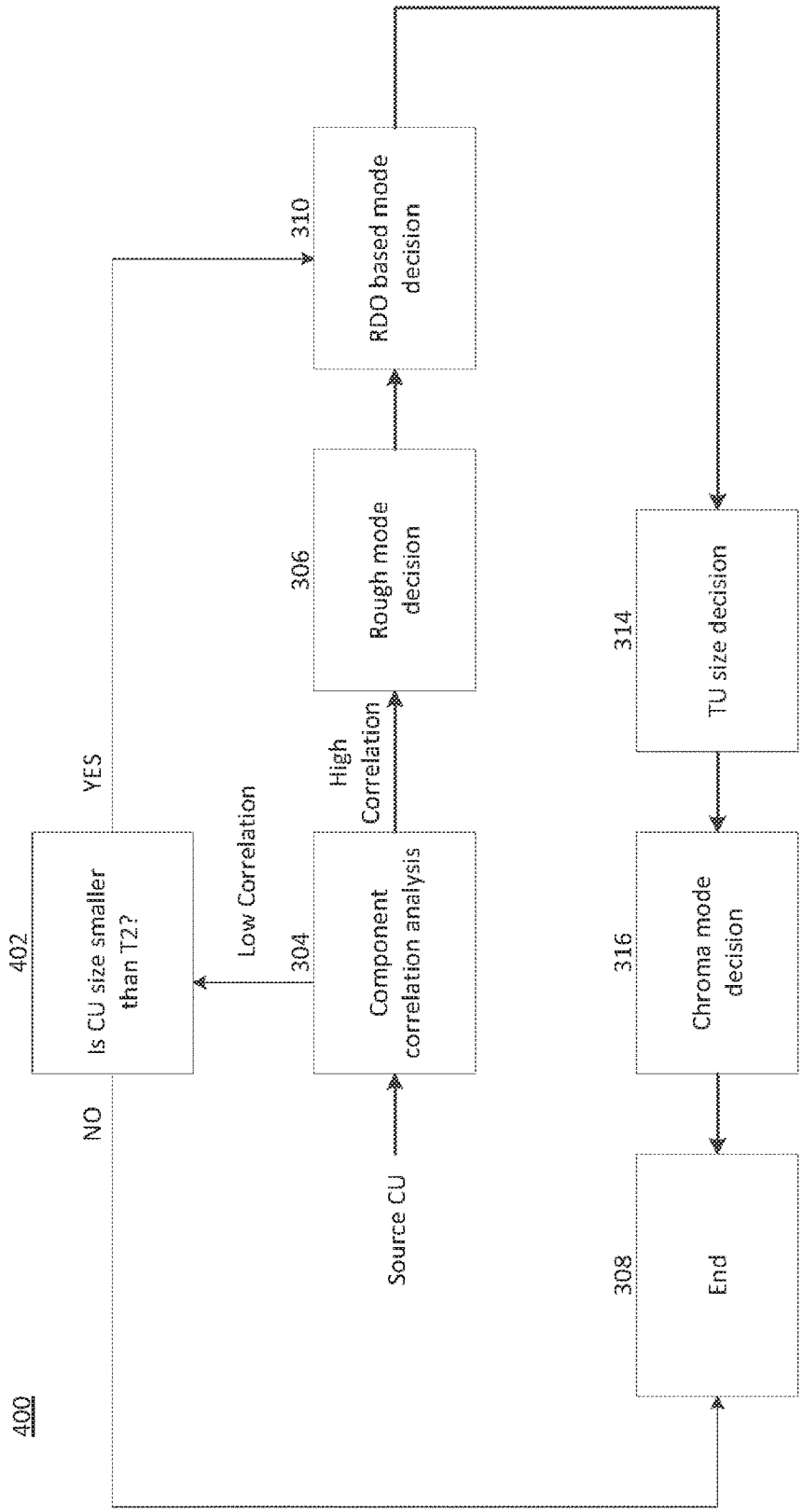
FIG. 4 illustrates an encoding method according to another exemplary embodiment of the present disclosure.

FIG. 4 illustrates an encoding method 400 that determines whether ACT should be enabled according to another exemplary embodiment of the present disclosure. More particularly, the encoding method 400 utilizes a threshold calculation regarding CU size in combination with a determination about correlations between color components of CU pixels. Based on the threshold calculation, ACT may be either enabled or disabled. Elements labeled the same as previously referenced refer to previously described elements.

At step 304, component correlation analysis is performed on the source CU to determine whether ACT should be enabled or disabled. The process that takes place at step 304 is as described for step 304 of encoding method 300. If it is determined that correlation between color components of the CU is high, ACT is enabled and the process proceeds through steps 306, 310, 314, 316, and 308 as described above for encoding method 300. However, if the correlation is determined to be low, the process moves to step 402.

At step 402, the CU size of the current CU being processed is determined. As discussed above, the CU is sized as N vertical by N horizontal (N×N) samples, where N may equal 4, 8, 16, 32, or 64. The N value for the CU is compared to a threshold T2. T2 may equal 4, 8, 16, 32, or 64. Based on the comparison, it is determined whether the CU size is smaller than T2. If the CU size is smaller than T2, ACT is enabled and the process proceeds to step 310 where an RDO based mode decision is made as described in step 310 of encoding method 300. However, if the CU size is equal to or greater than T2, the process proceeds to step 308, disabling ACT.

In Inter Prediction enabling ACT Module 204, when ACT is disabled during encoding method 400, the output from Module 204 is an inter predicted CU without adaptive color transform applied to it. Thus, in such a case, the output CU from Module 204 is equal to the output from Inter Prediction disabling ACT Module 206. Similarly, in Intra Prediction enabling Module 212, when ACT is disabled during encoding method 400, the output from Module 212 is an intra predicted CU without adaptive color transform applied to it. Thus, in such a case, the output CU from Module 212 is equal to the output from Intra Prediction disabling ACT Module 214.

The process of step 402 improves coding time and efficiency because a CU size equal to or greater than T2 implies that content of the CU, and thus the CU, is not complex. A CU size greater that T2 may mean that large areas of a video image are free of edges, motion, or complex patterns. In combination with already adequately de-correlated color components, there may not be a need for ACT in order to efficiently encode the CU.

Figure 5:
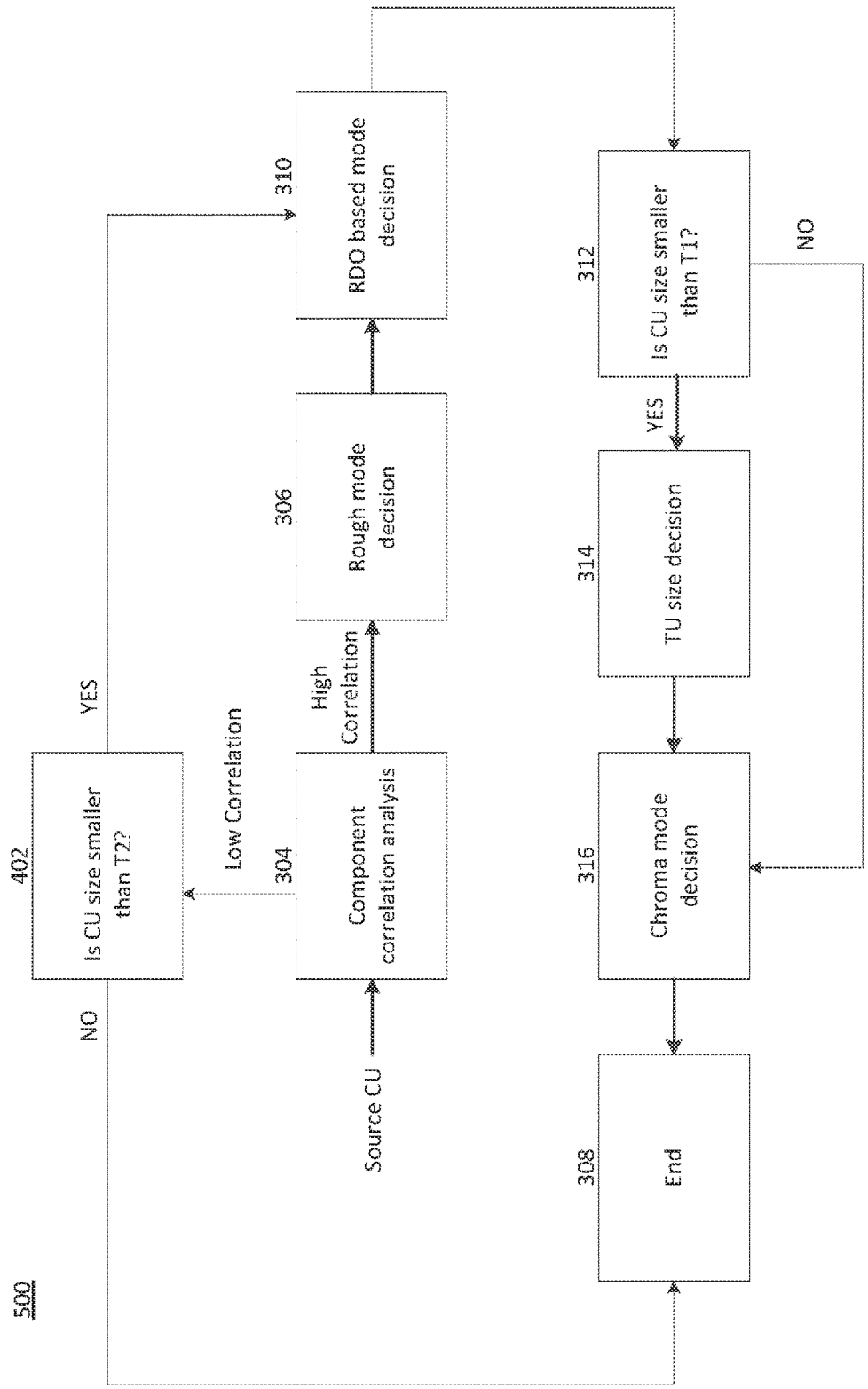
FIG. 5 illustrates an encoding method according to another exemplary embodiment of the present disclosure.

FIG. 5 illustrates an encoding method 500 that determines whether ACT should be enabled and whether TU size evaluation should be performed via two threshold calculations, according to another exemplary embodiment of the present disclosure. More particularly, encoding method 500 utilizes a first threshold calculation regarding CU size in combination with a determination about correlations between color components of CU pixels that determines whether ACT should be either enabled or disabled. Method 500 also utilizes a second threshold calculation regarding CU size, by which a determination is made as to whether a TU size evaluation should be performed. Elements labeled the same as previously referenced refer to previously described elements.

At step 304, component correlation analysis is performed on the source CU to determine whether ACT should be enabled or disabled. The process that takes place at step 304 is as described for step 304 of encoding method 300. If it is determined that correlation between color components of the CU is high, ACT is enabled and the process proceeds to step 306 for rough mode decision and thereafter, step 310 for RDO based mode decision. The processes that take place at steps 306 and 310 are as described previously for encoding method 300. However, if the correlation is determined to be low, the process moves to step 402.

At step 402, the CU size of the current CU being processed is calculated, as discussed previously for encoding method 400 (FIG. 4). If the CU size is smaller than T2, ACT is enabled and the process proceeds to step 310 for RDO based mode decision. However, if the CU size is equal to or greater than T2, the process proceeds to step 308, disabling ACT.

In Inter Prediction enabling ACT Module 204, when ACT is disabled during encoding method 500, the output from Module 204 is an inter predicted CU without adaptive color transform applied to it. Thus, in such a case, the output CU from Module 204 is equal to the output from Inter Prediction disabling ACT Module 206.

Similarly, in Intra Prediction enabling Module 212, when ACT is disabled during encoding method 500, the output from Module 212 is an intra predicted CU without adaptive color transform applied to it. Thus, in such a case, the output CU from Module 212 is equal to the output from Intra Prediction disabling ACT Module 214.

At step 310, RDO based mode decision is calculated as previously described for encoding method 300.

At step 312, the CU size of the current CU being processed is calculated as previously described for encoding method 300. It is determined whether the CU size of the CU is smaller than T1. If the CU size is smaller than T1, the process proceeds to step 314 for TU size decision. However, if the CU size is equal to or greater than T1, the process proceeds to step 316, bypassing the TU size decision step 314. The decision processes at steps 314 and 316 are the same as previously described for encoding method 300.

The thresholds T1 and T2 may be set as the same or as different values.

Encoding method 500 of FIG. 5 combines threshold calculations to improve both encoding efficiency and time. As described above, a CU size equal to or greater than T2 implies that content of the CU, and thus the CU, is not complex, and may feature large areas free of edges, motion, or complex patterns. In combination with already adequately de-correlated color components, there may not be a need for ACT in order to efficiently encode the CU. Furthermore, encoding cost is saved if the TU size decision at step 314 can be skipped.

Figure 6:
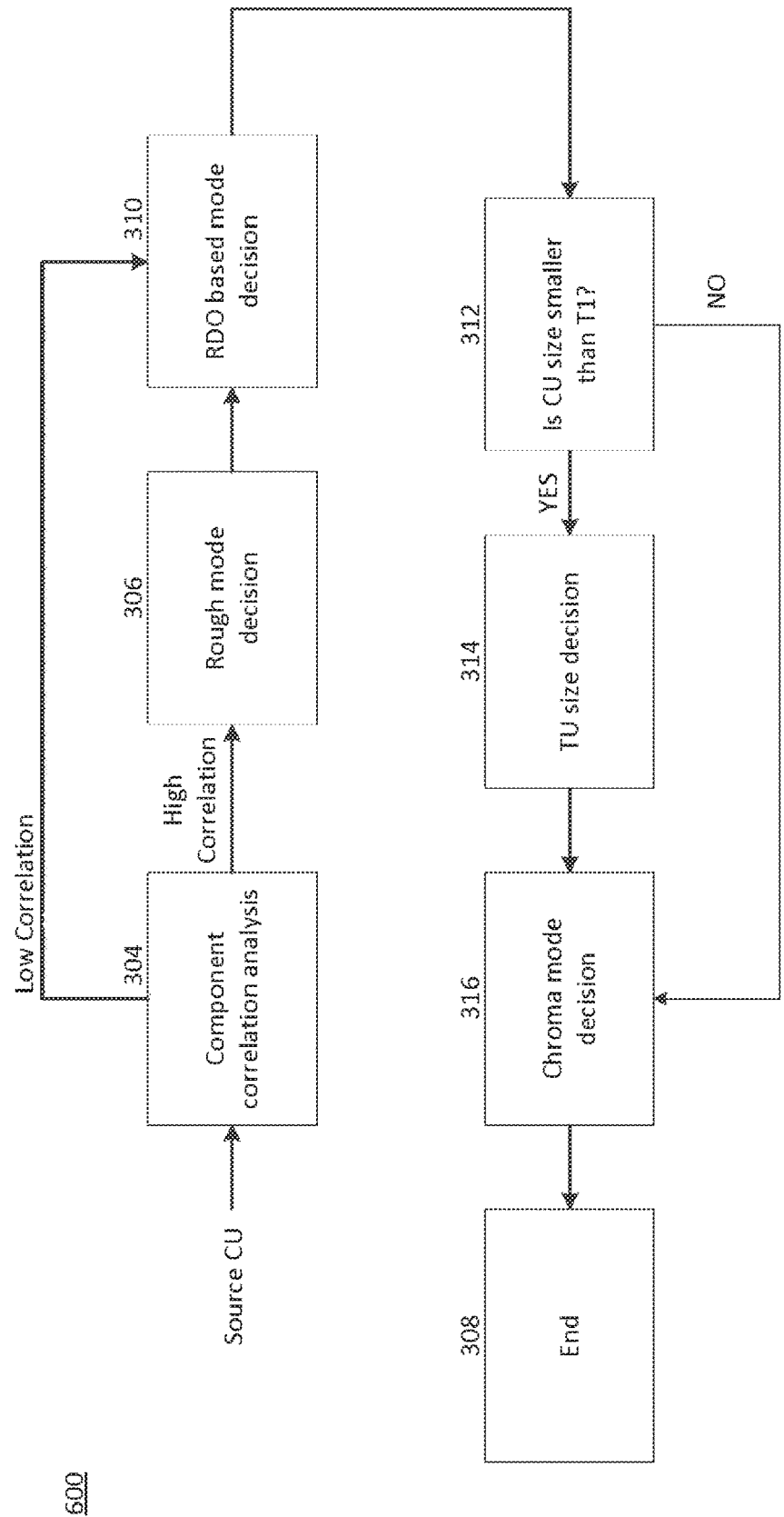
FIG. 6 illustrates an encoding method according to another exemplary embodiment of the present disclosure.

FIG. 6 illustrates an encoding method 600, similar to encoding method 300, that determines whether TU size evaluation should be performed in an ACT enabled intra prediction encoding process, according to an exemplary embodiment of the present disclosure. More particularly, encoding method 600 utilizes a threshold calculation regarding CU size and, based on the threshold calculation, determines whether a TU size evaluation should be performed.

At step 304, component correlation analysis is performed on the source CU to determine whether ACT should be enabled or disabled. The process that takes place at step 304 is as described for step 304 of encoding method 300. If it is determined that correlation between color components of the CU is high, ACT is enabled and the process proceeds to step 306 for rough mode decision and thereafter, step 310 for RDO based mode decision. The processes that take place at steps 306 and 310 are as described previously for encoding method 300. However, if at step 304, the correlation is determined to be low, or the color space is determined to be a YUV color space, the coding mode with ACT is enabled and the process proceeds directly to step 310, but the rough mode decision in step 306 is disabled. Here, for low correlation pixel components or a YUV color space, ACT is still enabled to check if further de-correlation of the pixel components will yield additional encoding benefits.

At step 310, RDO based mode decision is calculated as previously described for encoding method 300.

At step 312, the CU size of the current CU being processed is calculated as previously described for encoding method 300. It is determined whether the CU size of the CU is smaller than T1. If the CU size is smaller than T1, the process proceeds to step 314 for TU size decision. However, if the CU size is equal to or greater than T1, the process proceeds to step 316, bypassing the TU size decision step 314. The decision processes at steps 314 and 316 are the same as previously described for encoding method 300.

The thresholds T1 and T2 may be set as the same or as different values.

Decoding processes that perform the reverse steps of encoding methods 300, 400, 500, and 600 may be effective to decode the video encoded by encoding methods 300, 400, 500, and 600. Thus, decoding methods that perform the reverse steps of the processes recited in encoding methods 300, 400, 500, and 600 are contemplated by the present disclosure. Other decoding processes that include steps necessary to decode video encoded by encoding methods 300, 400, 500, and 600 are also contemplated by the present disclosure.

Figure 7:
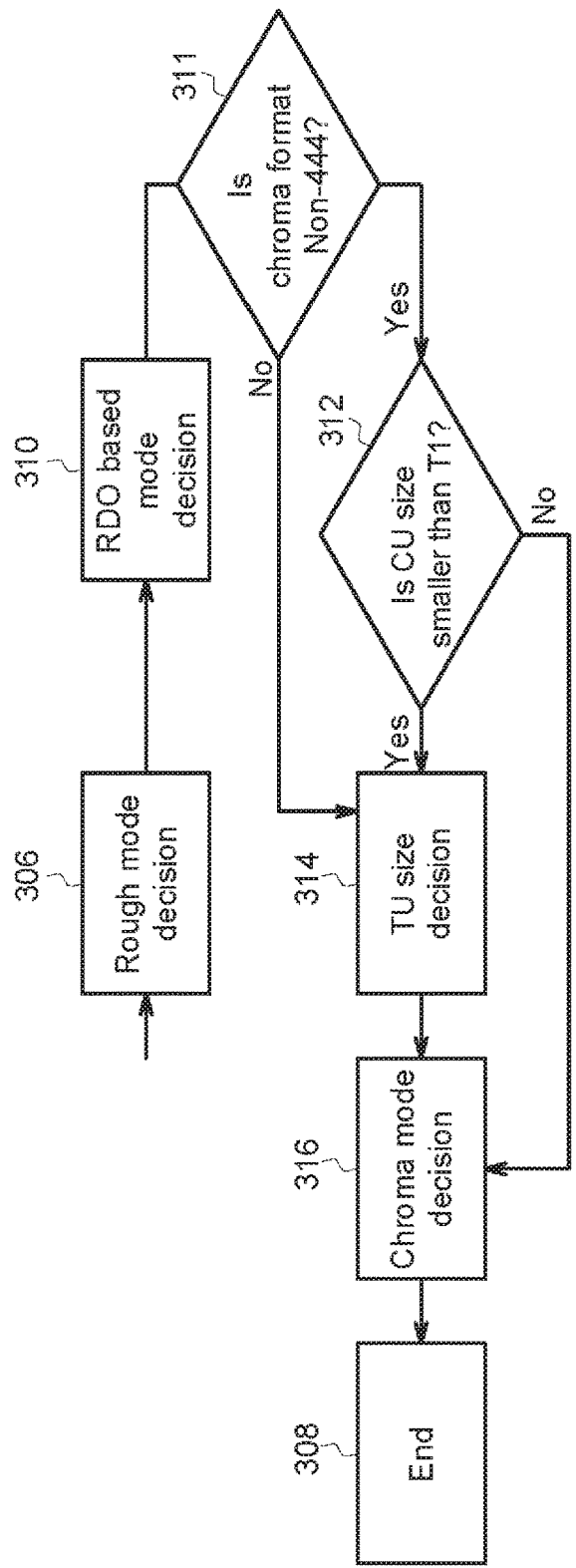
FIG. 7 illustrates an algorithm flow of the IPM for non-444 chroma formats.

If a large CU uses the IPM for screen visual content, it may imply that the content in that area is not complex, and it may be not necessary to further evaluate the smaller sizes of the TU. Therefore, the IPM for non-444 chroma formats is to disallow the TU partition in some large CUs. FIG. 7 illustrates an algorithm flow of the IPM for non-444 chroma formats. The processes that take place at steps 306 and 310 are as described previously for encoding method 300. At step 310, RDO based mode decision is calculated as previously described for encoding method 300.

At step 311, it is determined whether the chroma format is non-444. If the chroma format is non-444, the process proceeds to step 312. If the chroma format is not non-444, the process proceeds to step 314 for the TU size decision.

At step 312, the CU size of the current CU being processed is calculated as previously described for encoding method 300. It is determined whether the CU size of the CU is smaller than T1. If the CU size is smaller than T1, the process proceeds to step 314 for TU size decision. However, if the CU size is equal to or greater than T1, the process proceeds to step 316, bypassing the TU size decision step 314. The decision processes at steps 314 and 316 are the same as previously described for encoding method 300.

The thresholds T1 and T2 may be set as the same or as different values.

Figure 8:
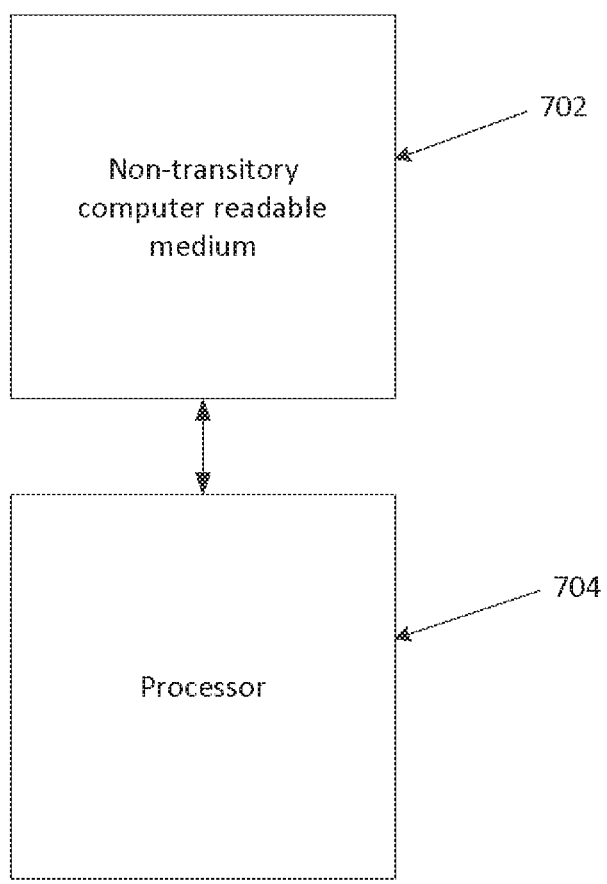
FIG. 8 shows a system for performing encoding and decoding methods and processes consistent with the present disclosure.

FIG. 8 shows a system 700 for performing the encoding and decoding methods consistent with the present disclosure. System 700 includes a non-transitory computer-readable medium 702 that may be a memory storing instructions capable of being performed by a processor 704. It is noted that one or more non-transitory computer-readable mediums 702 and/or one or more processors 704 may alternatively be utilized to perform encoding and decoding methods consistent with the present disclosure.

Non-transitory computer-readable medium 702 may be any sort of non-transitory computer-readable storage medium (CRM). A non-transitory computer-readable storage medium may include, for example, a floppy disk, a flexible disk, hard disk, hard drive, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. A computer-readable storage medium may store instructions for execution by at least one processor, including instructions for causing the processor to perform steps or stages consistent with the encoding and decoding methods described herein. Additionally, one or more computer-readable storage mediums may be used to implement the encoding and decoding methods described herein. The term "computer-readable storage medium" should be understood to include tangible items and exclude carrier waves and transient signals.

Processor 704 may be one or more of any sort of digital signal processor (DSP), application specific integrated circuit (ASIC), digital signal processing device (DSPD), programmable logic device (PLD), field programmable gate arrays (FPGA), controller, micro-controller, micro-processor, computer, or any other electronic component for performing the encoding and decoding methods described herein.

Experimental Results

The following is a description of experimental results obtained by testing the encoding methods described herein.

Tests were conducted using the HEVC SCC reference mode, SCM 4.0 under common test conditions (CTC). Coding performance of the encoding methods described herein was compared to the reference models for HEVC. Encoding was first performed using the HEVC reference model, with the encoding time recorded as encoding time A. Encoding using a test encoding method according to the encoding methods described herein was also performed, with encoding time recorded as encoding time B. Encoding time percent was calculated by dividing encoding time B by encoding time A. HEVC common test sequences were utilized as video under examination. Video featured mixed video frames with text, graphics, and motion; mixed content; animation; and camera captured content. Video with RGB and YUV color spaces were tested, with source video quality equaling 720p, 1080p, or 1440p. All intra prediction under lossy conditions, random access, and low-B prediction was utilized. All intra prediction compresses a video frame using information contained within the frame being currently compressed, while random access and low-B prediction compress a video frame by utilizing information within previously coded frames as well as the frame currently being compressed. Low-B prediction is also referred to as low delay B prediction in the following description. In each test, encoding time, as well as decoding time, was recorded, with percentages indicating the percent of time taken to encode or decode compared to exemplary encoding and decoding methods of the reference models. Positive percentages referring to each G/Y, B/U, and R/V component represent bit rate coding loss, while negative percentages represent bit rate coding gain, in relation to the original video source. For example, a 0.1% for a G/Y component represents a coding loss of 0.1% for the G/Y component in the encoded video compared to the G/Y component in the original video source. In another example, a −0.1% for a G/Y component represents a coding gain of 0.1% for the G/Y component in the encoded video compared to the G/Y component in the original video source.

Reference is made to encoding method 500 of FIG. 5 and Table 1 below. For encoding method 500, testing was performed under three settings. In setting 1, T2 and T1 were each set to 64. In setting 2, T2 was set to 64, while T1 was set to 32. In setting 3, T2 was set to 64, while T1 was set to 16. Intra prediction was the determined encoding mode.

In setting 1, when pixel components had low correlation, CU with CU sizes greater than or equal to 64×64 were encoded without ACT. CU sized smaller than 64×64 were encoded with ACT enabled. Furthermore, for CU sizes greater than or equal to 64×64, TU size decision 314 was skipped. For CU sizes less than 64×64, TU size decision 314 was performed.

In setting 2, when pixel components had low correlation, CU with CU sizes greater than or equal to 64×64 were encoded without ACT. CU sized smaller than 64×64 were encoded with ACT enabled. Furthermore, for CU sizes greater than or equal to 32×32, TU size decision 314 was skipped. For CU sizes less than 32×32, TU size decision 314 was performed.

In setting 3, when pixel components had low correlation, CU with CU sizes greater than or equal to 64×64 were encoded without ACT. CU sized smaller than 64×64 were encoded with ACT enabled. Furthermore, for CU sizes greater than or equal to 16×16, TU size decision 314 was skipped. For CU sizes less than 16×16, TU size decision 314 was performed.

TABLE 1

|  | Setting 1 | | | Setting 2 | | | Setting 3 | | |
| --- | --- | --- | --- | --- | --- | --- | --- | --- | --- |
| All Intra | G/Y | B/U | R/V | G/Y | B/U | R/V | G/Y | B/U | R/V |
| RGB, text & graphics with motion, 1080p & 720p | 0.0% | 0.0% | 0.0% | 0.1% | 0.0% | 0.0% | 0.1% | 0.0% | −0.1% |
| RGB, mixed content, 1440p & 1080p | 0.0% | 0.0% | 0.0% | 0.0% | 0.0% | 0.0% | 0.1% | 0.2% | 0.1% |
| RGB, Animation, 720p | 0.0% | 0.0% | 0.0% | 0.0% | 0.0% | 0.0% | 0.1% | 0.1% | 0.1% |
| RGB, camera captured, 1080p | 0.0% | 0.0% | 0.0% | 0.0% | 0.0% | 0.0% | 0.0% | 0.0% | 0.1% |
| YUV, text & graphics with motion, 1080p & 720p | 0.0% | 0.0% | 0.0% | 0.0% | 0.0% | 0.1% | 0.0% | 0.1% | 0.1% |
| YUV, mixed content, 1440p & 1080p | 0.1% | 0.1% | 0.1% | 0.0% | 0.0% | 0.0% | −0.1% | −0.1% | −0.1% |
| YUV, Animation, 720p | 0.0% | −0.1% | 0.0% | 0.0% | 0.1% | 0.0% | 0.0% | 0.0% | 0.1% |
| YUV, camera captured, 1080p | 0.0% | 0.0% | 0.0% | 0.0% | 0.0% | 0.0% | 0.0% | 0.0% | 0.0% |
| Enc Time [%] | 97% | | | 94% | | | 91% | | |
| Dec Time [%] | 100% | | | 100% | | | 100% | | |

As shown in Table 1, encoding performance in each of settings 1, 2, and 3 improved. Setting 1 showed a 3% reduction in encoding complexity, while setting 2 showed a 6% reduction in encoding complexity. Setting 3 showed the greatest reduction in encoding complexity, with a reduction of 9%. Thus, all settings exhibited an improvement in coding efficiency. While each setting featured minimal loss of bit rate, encoding time and efficiency was improved.

Reference is made to encoding method 500 and Tables 2 and 3 below. Here, testing was performed under all intra, random access, and low delay B. In Test 1, T2 and T1 were both set to 32. In Test 2, T2 and T1 were both set to 16. Consistent with method 500, TU evaluation was disabled for CU with CU sizes greater than or equal to 32×32 in Test 1, and CU with CU sizes greater than or equal to 32×32 were encoded without ACT. CU sized smaller than 32×32 were encoded with ACT enabled. In Test 2, TU evaluation was disabled for CU with CU sizes greater than or equal to 16×16, and CU with CU sizes greater than or equal to 16×16 were encoded without ACT. CU sized smaller than 16×16 were encoded with ACT enabled. Testing was conducted in lossy conditions, with full frame intra block copy utilized.

TABLE 2

|  | All Intra | | | Random Access | | | Low delay B | | |
| --- | --- | --- | --- | --- | --- | --- | --- | --- | --- |
|  | G/Y | B/U | R/V | G/Y | B/U | R/V | G/Y | B/U | R/V |
| Test 1: N = 32 × 32 | | | | | | | | | |
| RGB, text & graphics with motion, 1080p & 720p | −0.1% | 0.0% | −0.1% | 0.0% | 0.0% | 0.0% | 0.0% | 0.0% | 0.0% |
| RGB, mixed content, 1440p & 1080p | 0.0% | 0.0% | 0.0% | 0.0% | 0.0% | 0.0% | 0.1% | 0.1% | 0.1% |
| RGB, Animation, 720p | 0.0% | 0.0% | 0.0% | 0.0% | 0.0% | 0.0% | 0.0% | 0.1% | 0.1% |
| RGB, camera captured, 1080p | 0.0% | 0.0% | 0.0% | 0.0% | 0.0% | 0.1% | 0.0% | −0.1% | −0.1% |

TABLE 2-continued

|  | All Intra | | | Random Access | | | Low delay B | | |
|---|---|---|---|---|---|---|---|---|---|
|  | G/Y | B/U | R/V | G/Y | B/U | R/V | G/Y | B/U | R/V |
| YUV, text & graphics with motion, 1080p & 720p | 0.0% | 0.0% | 0.1% | 0.0% | 0.0% | 0.0% | 0.0% | 0.0% | 0.1% |
| YUV, mixed content, 1440p & 1080p | 0.0% | 0.0% | 0.0% | 0.0% | 0.0% | −0.1% | 0.0% | 0.2% | −0.1% |
| YUV, Animation, 720p | 0.0% | 0.1% | 0.1% | 0.0% | 0.0% | 0.2% | −0.1% | 0.3% | 0.1% |
| YUV, camera captured, 1080p | 0.0% | 0.0% | 0.0% | 0.1% | 0.0% | −0.1% | 0.0% | 0.0% | 0.0% |
| Enc Time [%] |  | 95% |  |  | 99% |  |  | 99% |  |
| Dec Time [%] |  | 100% |  |  | 100% |  |  | 100% |  |
| Test 2: N = 16 × 16 |  |  |  |  |  |  |  |  |  |
| RGB, text & graphics with motion, 1080p & 720p | 0.0% | 0.0% | 0.0% | 0.0% | 0.0% | 0.1% | 0.0% | 0.0% | 0.0% |
| RGB, mixed content, 1440p & 1080p | 0.1% | 0.1% | 0.1% | 0.0% | 0.0% | 0.0% | 0.2% | 0.1% | 0.1% |
| RGB, Animation, 720p | 0.1% | 0.1% | 0.1% | 0.0% | 0.0% | 0.0% | 0.0% | 0.1% | 0.1% |
| RGB, camera captured, 1080p | 0.1% | 0.0% | 0.1% | 0.0% | 0.1% | 0.1% | 0.0% | 0.0% | 0.0% |
| YUV, text & graphics with motion, 1080p & 720p | 0.0% | 0.0% | 0.0% | 0.0% | 0.0% | 0.0% | −0.1% | −0.1% | −0.2% |
| YUV, mixed content, 1440p & 1080p | 0.0% | 0.0% | 0.0% | −0.1% | −0.2% | −0.2% | 0.1% | 0.2% | 0.0% |
| YUV, Animation, 720p | 0.0% | 0.2% | 0.2% | 0.0% | 0.0% | 0.4% | 0.0% | 0.2% | 0.1% |
| YUV, camera captured, 1080p | 0.0% | 0.0% | 0.0% | 0.0% | 0.0% | −0.2% | −0.1% | 0.1% | 0.0% |
| Enc Time [%] |  | 92% |  |  | 99% |  |  | 100% |  |
| Dec Time [%] |  | 100% |  |  | 100% |  |  | 100% |  |

As shown in Table 2, in Test 1, all intra mode resulted in a 5% reduction in encoding complexity. Random access and low delay B each produced a 1 percent encoding complexity reduction. Each setting showed very minimal bit-rate loss, with all intra and random access modes showing almost no change in bit-rate.

In Test 2, all intra mode resulted in an 8% reduction in encoding complexity. Random access produced a 1 percent encoding complexity reduction, while low delay B produced no change in encoding complexity. Each mode featured more bit-rate loss compared to Test 1, but bit-rate loss was still minimal because it only registered in the decimal percentage range. A decimal percentage bit rate loss means that compared to the original video, the encoded video experienced only a small reduction in bit rate, and therefore only a small loss of video quality. Such a small loss in video quality is acceptable in most applications due to the improved encoding time achieved by encoding method 500.

TABLE 3

|  | All Intra | | | | Random Access | | | | Low Delay B | | | |
|---|---|---|---|---|---|---|---|---|---|---|---|---|
| Test 1: N = 32 × 32 | bit-rate charge (Total) | bit-rate charge (Average) | bit-rate charge (Min) | bit-rate charge (Max) | bit-rate charge (Total) | bit-rate charge (Average) | bit-rate charge (Min) | bit-rate charge (Max) | bit-rate charge (Total) | bit-rate charge (Average) | bit-rate charge (Min) | bit-rate charge (Max) |
| RGB, text & graphics with motion, 1080p & 720p | 0.0% | 0.0% | 0.0% | 0.0% | 0.0% | 0.0% | 0.0% | 0.0% | 0.0% | 0.0% | 0.0% | 0.0% |
| RGB, mixed content, 1440p & 1080p | 0.0% | 0.0% | 0.0% | 0.0% | 0.0% | 0.0% | 0.0% | 0.0% | 0.0% | 0.0% | 0.0% | 0.0% |
| RGB, Animation, 720p | 0.0% | 0.0% | 0.0% | 0.0% | 0.0% | 0.0% | 0.0% | 0.0% | 0.0% | 0.0% | 0.0% | 0.0% |
| RGB, camera captured, 1080p | 0.0% | 0.0% | 0.0% | 0.0% | 0.0% | 0.0% | 0.0% | 0.0% | 0.0% | 0.0% | 0.0% | 0.0% |
| YUV, text & graphics with motion, 1080p & 720p | 0.0% | 0.0% | 0.0% | 0.0% | 0.0% | 0.0% | 0.0% | 0.0% | 0.0% | 0.0% | 0.0% | 0.0% |
| YUV, mixed content, 1440p & 1080p | 0.0% | 0.0% | 0.0% | 0.0% | 0.0% | 0.0% | 0.0% | 0.0% | 0.0% | 0.0% | 0.0% | 0.0% |
| YUV, Animation, 720p | 0.0% | 0.0% | 0.0% | 0.0% | 0.0% | 0.0% | 0.0% | 0.0% | 0.0% | 0.0% | 0.0% | 0.0% |
| YUV, camera captured, 1080p | 0.0% | 0.0% | 0.0% | 0.0% | 0.0% | 0.0% | 0.0% | 0.0% | 0.0% | 0.0% | 0.0% | 0.0% |
| Enc Time [%] |  | 99% |  |  |  | 100% |  |  |  | 100% |  |  |
| Dec Time [%] |  | 100% |  |  |  | 100% |  |  |  | 100% |  |  |

|  | All Intra | | | | Random Access | | | | Low Delay B | | | |
|---|---|---|---|---|---|---|---|---|---|---|---|---|
| Test 2: N = 16 × 16 | bit-rate charge (Total) | bit-rate charge (Average) | bit-rate charge (Min) | bit-rate charge (Max) | bit-rate charge (Total) | bit-rate charge (Average) | bit-rate charge (Min) | bit-rate charge (Max) | bit-rate charge (Total) | bit-rate charge (Average) | bit-rate charge (Min) | bit-rate charge (Max) |
| RGB, text & graphics with motion, 1080p & 720p | 0.0% | 0.0% | 0.0% | 0.0% | 0.0% | 0.0% | 0.0% | 0.0% | 0.0% | 0.0% | 0.0% | 0.0% |
| RGB, mixed content, 1440p & 1080p | 0.0% | 0.0% | 0.0% | 0.0% | 0.0% | 0.0% | 0.0% | 0.0% | 0.0% | 0.0% | 0.0% | 0.0% |
| RGB, Animation, 720p | 0.0% | 0.0% | 0.0% | 0.0% | 0.0% | 0.0% | 0.0% | 0.0% | 0.0% | 0.0% | 0.0% | 0.0% |
| RGB, camera captured, 1080p | 0.0% | 0.0% | 0.0% | 0.0% | 0.0% | 0.0% | 0.0% | 0.0% | 0.0% | 0.0% | 0.0% | 0.0% |
| YUV, text & graphics with motion, 1080p & 720p | 0.0% | 0.0% | 0.0% | 0.0% | 0.0% | 0.0% | 0.0% | 0.0% | 0.0% | 0.0% | 0.0% | 0.0% |

TABLE 3-continued

| | | | | | | | | | | | | |
|---|---|---|---|---|---|---|---|---|---|---|---|---|
| YUV, mixed content, 1440p & 1080p | 0.0% | 0.0% | 0.0% | 0.0% | 0.0% | 0.0% | 0.0% | 0.0% | 0.0% | 0.0% | 0.0% | 0.0% |
| YUV, Animation, 720p | 0.0% | 0.0% | 0.0% | 0.0% | 0.0% | 0.0% | 0.0% | 0.0% | 0.0% | 0.0% | 0.0% | 0.0% |
| YUV, camera captured, 1080p | 0.0% | 0.0% | 0.0% | 0.0% | 0.0% | 0.0% | 0.0% | 0.0% | 0.0% | 0.0% | 0.0% | 0.0% |
| Enc Time [%] | | | 99% | | | | | 100% | | | | 100% |
| Dec Time [%] | | | 100% | | | | | 100% | | | | 100% |

As shown in Table 3, in Test 1 and Test 2, each mode featured zero amount of bit-rate change in total or as an average. All intra mode featured the best reduction in encoding complexity, showing a 1% reduction in each test.

Reference is made to encoding method 500 described in FIG. 5 and Table 4. Here, testing was conducted in lossy conditions, with 4-CTU intra block copy utilized and a chroma mode of 4:4:4. Intra block copy utilizes a motion vector to copy a block from a previously coded CU in the currently coded video frame. 4-CTU indicates the allowable searching area for the motion vector.

In Test 1, T2 and T1 were both set to 32. In Test 2, T2 and T1 were both set to 16. Consistent with method 500, TU evaluation was disabled for CU with CU sizes greater than or equal to 32×32 in Test 1, and TU evaluation was disabled for CU with CU sizes greater than or equal to 16×16 in Test 2. ACT was enabled for CU sizes less than 32×32 in Test 1, with ACT disabled when CU sizes were greater than or equal to 32×32. In Test 2, ACT was enabled for CU sizes smaller than 16×16, with ACT disabled when CU sizes were greater than or equal to 16×16.

nents of a CU, determination at step 402 was performed to determine whether the CU size of the CU was smaller than 64×64. If the CU size of the CU was smaller than 64×64, ACT was enabled and RDO based mode decision was performed at step 310. If CU size of the CU was greater than or equal to 64×64, the ACT was disabled and the process proceeded to step 308. Testing conditions were based on lossy all intra encoding mode with full frame intra block copy in Test 1, and lossy all intra encoding mode with 4 CTU IBC in Test 2. Chroma mode was selected as 4:4:4 in each test.

TABLE 5.1

| | Test 1 | | | |
|---|---|---|---|---|
| AI, Lossy, FF-IBC search | G/Y | B/U | R/V | Encoding time |
| YUV, text & graphics with motion, 1080p & 720p | 0.0% | 0.0% | 0.0% | 97% |
| YUV, mixed content, 1440p & 1080p | 0.0% | 0.0% | 0.0% | 97% |

TABLE 4

| | All Intra | | | Random Access | | | Low delay B | | |
|---|---|---|---|---|---|---|---|---|---|
| | G/Y | B/U | R/V | G/Y | B/U | R/V | G/Y | B/U | R/V |
| Test 1: N = 32 × 32 | | | | | | | | | |
| RGB, text & graphics with motion, 1080p & 720p | 0.0% | 0.0% | 0.0% | 0.0% | 0.0% | 0.0% | 0.0% | 0.0% | 0.1% |
| RGB, mixed content, 1440p & 1080p | 0.0% | 0.0% | 0.0% | −0.1% | 0.0% | 0.0% | 0.1% | 0.0% | 0.2% |
| RGB, Animation, 720p | 0.0% | 0.0% | 0.0% | 0.0% | 0.0% | 0.1% | 0.0% | −0.1% | 0.0% |
| RGB, camera captured, 1080p | 0.0% | 0.0% | 0.0% | 0.0% | 0.0% | 0.0% | 0.0% | 0.0% | 0.0% |
| YUV, text & graphics with motion, 1080p & 720p | 0.0% | 0.0% | 0.0% | 0.0% | 0.0% | 0.0% | 0.0% | 0.2% | 0.1% |
| YUV, mixed content, 1440p & 1080p | 0.0% | 0.0% | 0.0% | 0.0% | 0.0% | 0.0% | 0.0% | 0.2% | 0.2% |
| YUV, Animation, 720p | 0.0% | 0.1% | 0.1% | 0.0% | 0.2% | 0.2% | −0.1% | −0.2% | 0.1% |
| YUV, camera captured, 1080p | 0.0% | 0.0% | 0.0% | 0.0% | 0.1% | 0.0% | 0.0% | −0.1% | 0.1% |
| Enc Time [%] | | 95% | | | 99% | | | 99% | |
| Dec Time [%] | | 100% | | | 100% | | | 100% | |
| Test 2: N = 16 × 16 | | | | | | | | | |
| RGB, text & graphics with motion, 1080p & 720p | 0.0% | 0.0% | 0.0% | 0.0% | 0.0% | 0.0% | 0.0% | 0.0% | 0.1% |
| RGB, mixed content, 1440p & 1080p | 0.1% | 0.1% | 0.1% | 0.1% | 0.1% | 0.1% | −0.1% | −0.1% | 0.1% |
| RGB, Animation, 720p | 0.1% | 0.1% | 0.1% | 0.0% | 0.0% | 0.0% | 0.0% | −0.1% | −0.1% |
| RGB, camera captured, 1080p | 0.1% | 0.0% | 0.1% | 0.0% | 0.0% | 0.1% | 0.0% | 0.0% | −0.1% |
| YUV, text & graphics with motion, 1080p & 720p | 0.0% | 0.0% | 0.0% | 0.0% | 0.0% | 0.1% | 0.0% | 0.1% | 0.0% |
| YUV, mixed content, 1440p & 1080p | 0.0% | 0.0% | 0.0% | 0.0% | 0.0% | 0.0% | 0.0% | 0.2% | 0.2% |
| YUV, Animation, 720p | 0.0% | 0.2% | 0.2% | 0.0% | 0.3% | 0.3% | 0.0% | −0.1% | 0.2% |
| YUV, camera captured, 1080p | 0.0% | 0.0% | 0.0% | 0.0% | 0.3% | 0.0% | 0.1% | 0.0% | 0.1% |
| Enc Time [%] | | 92% | | | 99% | | | 100% | |
| Dec Time [%] | | 100% | | | 100% | | | 100% | |

As shown in Table 4, in Test 1 and Test 2, each mode featured minimal bit-rate change in all intra, random access, or low-delay B modes. All intra featured the best reduction in encoding complexity in both tests, showing a 5% reduction Test 1, and an 8% reduction in Test 2.

Reference is made to encoding method 400 of FIG. 4, and Tables 5.1 and 5.2 below. Here, testing was performed with T2 set to 64. Thus, when component correlation analysis at step 304 determined low correlation amount color compo- TABLE 5.1-continued

| | Test 1 | | | |
|---|---|---|---|---|
| AI, Lossy, FF-IBC search | G/Y | B/U | R/V | Encoding time |
| YUV, Animation, 720p | 0.0% | 0.1% | 0.1% | 99% |
| YUV, camera captured, 1080p | 0.0% | 0.0% | 0.0% | 98% |

TABLE 5.2

| Al, Lossy, 4-CTU IBC search | G/Y | B/U | R/V | Encoding time |
|---|---|---|---|---|
| YUV, text & graphics with motion, 1080p & 720p | 0.0% | 0.0% | 0.0% | 97% |
| YUV, mixed content 1440p & 1080p | 0.0% | 0.0% | 0.0% | 97% |
| YUV, Animation, 720p | 0.0% | 0.1% | 0.1% | 98% |
| YUV, camera captured 1080p | 0.0% | 0.0% | 0.0% | 98% |

Test 2 (header above)

As shown by Table 5.1, for YUV color spaces and lossy all intra (AI) encoding utilizing full frame IBC, encoding method 400 resulted in a 1% to 3% reduction in encoding time, with minimal bit-rate loss. Table 5.2 shows that in lossy all intra encoding utilizing 4-CTU IBC search, the encoding method 400 resulted in similar reduction in encoding time, with minimal bit-rate loss, as in Table 5.1: Test 1.

Reference is made to encoding method 400 and Table 6 below. Here, T2 was set to 64. Lossless intra encoding was performed, with chroma mode selected as 4:4:4.

TABLE 6

| | Bit-rate change (Total) | Bit-rate change (Average) | Bit-rate change (Min) | Bit-rate change (Max) | Encoding Time |
|---|---|---|---|---|---|
| YUV, text & graphic with motion, 1080p & 720p | 0.0% | 0.0% | 0.0% | 0.0% | 98.7% |
| YUV, mixed content, 1440p & 1080p | 0.0% | 0.0% | 0.0% | 0.0% | 98.4% |
| YUV, Animation, 720p | 0.0% | 0.0% | 0.0% | 0.0% | 100.0% |
| YUV, camera captured, 1080p | 0.0% | 0.0% | 0.0% | 0.0% | 98.2% |

For YUV color spaces, the encoding method 400 resulted in a 0% to about 2% saving of encoding time.

Reference is made to encoding method 300 (FIG. 3) and Table 7 below. Here, T1 was set to 32 in Test 1, and to 16 in Test 2. Consistent with method 300, in Test 1, for CU with CU sizes greater than or equal to 32×32, the TU size decision 314 was skipped. For CU with CU sizes less than 32×32, TU size decision 314 was performed. In Test 2, for CU with CU sizes greater than or equal to 16×16, the TU size decision 314 was skipped. For CU with CU sizes less than 16×16, TU size decision 314 was performed. Lossy all intra encoding with ACT enabled was performed.

Encoding time in Test 1 was reduced by between 3% to 6%. In Test 2, encoding time was reduced by between 6% to 10%. Thus, allowing TU size decisions only for CU sized less than 32×32 or 16×16 aided encoding efficiency.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Preparing computer programs based on the written description and methods of this specification is within the skill of a software developer. The various programs or program Modules can be created using a variety of programming techniques. For example, program sections or program Modules can be designed in or by means of Java, C, C++, assembly language, or any such programming languages. One or more of such software sections or Modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

Other embodiments of the disclosure will be apparent to those skilled in the art from consideration of the specification and practice of the disclosure herein. The scope of the disclosure is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

TABLE 7

| AI Lossy | Test1: when CU ≥32 × 32 G/Y | B/U | R/V | Encoding time [%] | Test2: when CU ≥16 × 16 G/Y | B/U | R/V | Encoding time [%] |
|---|---|---|---|---|---|---|---|---|
| RGB, TGM, 1080p & 720p | −0.1% | 0.0% | −0.1% | 96% | 0.0% | 0.0% | 0.0% | 94% |
| RGB, mixed, 1440p & 1080p | 0.0% | 0.0% | 0.0% | 96% | 0.1% | 0.1% | 0.1% | 94% |
| RGB, Animation, 720p | 0.0% | 0.0% | 0.0% | 97% | 0.1% | 0.1% | 0.1% | 94% |
| RGB, camera captured, 1080p | 0.0% | 0.0% | 0.0% | 96% | 0.1% | 0.0% | 0.1% | 93% |
| YUV, TGM, 1080p & 720p | 0.0% | 0.0% | 0.1% | 95% | 0.0% | 0.0% | 0.0% | 92% |
| YUV, mixed, 1440p & 1080p | 0.0% | 0.0% | 0.0% | 95% | 0.0% | 0.0% | 0.0% | 92% |
| YUV, Animation, 720p | 0.0% | 0.0% | 0.0% | 96% | 0.0% | 0.2% | 0.1% | 92% |
| YUV, camera captured, 1080p | 0.0% | 0.0% | 0.0% | 94% | 0.0% | 0.0% | 0.0% | 90% |
| Enc Time [%] | | | | 96% | | | | 93% |
| Dec Time [%] | | | | 100% | | | | 100% |

What is claimed is:

1. A video encoding method, comprising:
receiving a source video frame;
dividing the source video frame into a coding tree unit;
determining a coding unit from the coding tree unit;
enabling a coding mode of the coding unit, wherein the coding mode includes an inter prediction enabling adaptive color transform (ACT), an inter prediction disabling ACT, an intra prediction enabling ACT, and an intra prediction disabling ACT, and the size of the coding unit is defined by a number (N) of samples;
determining whether N is smaller than a first threshold;
calculating, when N is smaller than the first threshold and the enabled coding mode is the inter prediction enabling ACT or the intra prediction enabling ACT, the size of the transform unit, and setting the size of the transform unit; and
determining, when N is not smaller than the first threshold and the enabled coding mode is the inter prediction enabling ACT or the intra prediction enabling ACT, a color space of the coding unit;
wherein a comparison among the inter prediction enabling ACT, the inter prediction disabling ACT, the intra prediction enabling ACT, and the intra prediction disabling ACT is performed and then the enabled coding mode is selected based on the comparison;
wherein when the size of the coding unit is not smaller than the first threshold, the step of calculating the size of the transform unit is ignored and the step of determining the color space of the coding unit is directly performed.

2. The method of claim 1, wherein
the step of determining the color space comprises determining whether the color space is a red, green, and blue (RGB) color space or a luminance and chrominance (YUV) color space.

3. The method of claim 2, further comprising:
enabling, if the enabled coding mode is the intra prediction mode enabling adaptive color transform, a rough mode decision having a low complexity cost when the color space is determined to be the RGB color space.

4. The method of claim 2, further comprising:
disabling, if the enabled coding mode is the intra prediction mode enabling adaptive color transform, a rough mode decision having a low complexity cost when the color space is determined to be the YUV color space.

5. The method of claim 2, further comprising:
determining whether N is smaller than a second threshold;
disabling the coding mode of the coding unit when the color space is determined to be the YUV color space and N is greater than or equal to second threshold.

6. The method of claim 2, further comprising
determining whether N is smaller than a second threshold; and
enabling, when the color space is determined to be the YUV color space and N is smaller than the second threshold, the inter prediction enabling ACT or the intra prediction enabling ACT.

7. The method of claim 2, further comprising:
determining whether N is greater than or equal to a second threshold;
enabling, when the color space is determined to be the YUV color space and when N is smaller than the first threshold, the inter prediction enabling ACT or the intra prediction enabling ACT.

8. The method of claim 1, further comprising:
evaluating the size of the transform unit if the source video frame has a non-444 chroma format and N is smaller than the first threshold.

9. The method of claim 1, further comprising:
determining correlations between color components of pixels within the coding unit;
wherein the coding mode of the coding unit is enabled based on at least in part on a degree of the correlations determined for the coding unit; and
the coding mode is selected based on a comparison of encoding costs and encoding qualities associated with the inter prediction enabling ACT, the inter prediction disabling ACT, the intra prediction enabling ACT, and the intra prediction disabling ACT.

10. The method of claim 1, wherein
determining correlations between color components of pixels within the coding unit comprises determining the color space of the coding unit.

11. The method of claim 1, wherein
determining correlations between color components of pixels within the coding unit comprises comparing a correlation between color components of a pixel within the coding unit and the second threshold.

12. A video encoding system, comprising:
a memory storing instructions; and
a processor configured to execute the instructions to perform steps of:
receive a source video frame;
divide the source video frame into a coding tree unit;
determine a coding unit from the coding tree unit;
enable a coding mode of the coding unit, wherein the coding mode includes an inter prediction enabling adaptive color transform (ACT), an inter prediction disabling ACT, an intra prediction enabling ACT, and an intra prediction disabling ACT, and the size of the coding unit is defined by a number (N) of samples;
determine whether N is smaller than a first threshold;
calculate, when N is smaller than the first threshold and the enabled coding mode is the inter prediction enabling ACT or the intra prediction enabling ACT, the size of the transform unit, and setting the size of the transform unit; and
determine, when N is not smaller than the first threshold and the enabled coding mode is the inter prediction enabling ACT or the intra prediction enabling ACT, a color space of the coding unit;
wherein a comparison among the inter prediction enabling ACT, the inter prediction disabling ACT, the intra prediction enabling ACT, and the intra prediction disabling ACT is performed and then the enabled coding mode is selected based on the comparison;
wherein when the size of the coding unit is not smaller than the first threshold, the processor ignores calculating the size of the transform unit and the processor directly determines the color space of the coding unit.

13. The system of claim 12, wherein the processor is further configured to execute instructions to:
determine the color space by determining whether the color space is a red, green, and blue (RGB) color space or a luminance and chrominance (YUV) color space.

14. The system of claim 13, wherein the processor is further configured to execute instructions to:
determine whether N is smaller than a second threshold; and
enable, when the color space is determined to be the YUV color space and when N is smaller than the second threshold, the inter prediction enabling ACT or the intra prediction enabling ACT.

15. The system of claim 13, wherein the processor is further configured to execute instructions to:
determine whether N is greater than or equal to a second threshold; and
enable, when the color space is determined to be the YUV color space and when N is not greater than or equal to the second threshold, a coding mode which is the inter prediction enabling ACT or the intra prediction enabling ACT.

16. The system of claim 12, wherein the processor is further configured to execute instructions to:
calculate the size of the transform unit if the source video frame has a non-444 chroma format and N is smaller than the first threshold.

17. The system of claim 12, wherein the coding mode of the coding unit is enabled based at least in part on a degree of the correlations determined for the coding unit.

18. The system of claim 12, wherein the processor is configured to execute the instructions to further perform
determine correlations between color components of pixels within the coding unit by determining the color space of the coding unit.

19. A non-transitory computer-readable storage medium storing a set of instructions that, when executed by one or more processors, cause the one or more processors to perform a method of video encoding, the method comprising:
receiving a source video frame;
dividing the source video frame into a coding tree unit;
determining a coding unit from the coding tree unit;
enabling a coding mode of the coding unit, wherein the coding mode includes an inter prediction enabling adaptive color transform (ACT), an inter prediction disabling ACT, an intra prediction enabling ACT, and an intra prediction disabling ACT, and the size of the coding unit is defined by a number (N) of samples;
determining whether N is smaller than a first threshold; and
calculating the size of the transform unit and setting the size of the transform unit, when N is smaller than the first threshold and the enabled coding mode is the inter prediction enabling ACT or the intra prediction enabling ACT; and
determining, when N is not smaller than the first threshold and the enabled coding mode is the inter prediction enabling ACT or the intra prediction enabling ACT, a color space of the coding unit;
wherein a comparison among the inter prediction enabling ACT, the inter prediction disabling ACT, the intra prediction enabling ACT, and the intra prediction disabling ACT is performed and then the enabled coding mode is selected based on the comparison;
wherein when the size of the coding unit is not smaller than the first threshold, the step of calculating the size of the transform unit is ignored and the step of determining the color space of the coding unit is directly performed.

20. The non-transitory computer-readable storage medium of claim 19, wherein the method further comprises:
determining correlations between color components of pixels within the coding unit.

* * * * *